US012812063B2

(12) United States Patent
Park et al.

(10) Patent No.: US 12,812,063 B2
(45) Date of Patent: Nov. 24, 2026

(54) ELECTRONIC APPARATUS AND METHOD THEREOF FOR PERFORMING IMAGE SYNTHESIS

(71) Applicant: SAMSUNG ELECTRONICS CO., LTD., Suwon-si (KR)

(72) Inventors: Jaesung Park, Suwon-si (KR); Youngsu Moon, Suwon-si (KR); Junghwa Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 18/372,383

(22) Filed: Sep. 25, 2023

(65) Prior Publication Data

US 2024/0114107 A1 Apr. 4, 2024

Related U.S. Application Data

(63) Continuation of application No. PCT/KR2023/012858, filed on Aug. 30, 2023.

(30) Foreign Application Priority Data

Sep. 29, 2022 (KR) ........................ 10-2022-0124663
Dec. 27, 2022 (KR) ........................ 10-2022-0186376

(51) Int. Cl.
*G06T 3/4038* (2024.01)
*G06T 3/4046* (2024.01)
*H04N 5/262* (2006.01)

(52) U.S. Cl.
CPC ......... *H04N 5/2624* (2013.01); *G06T 3/4038* (2013.01); *G06T 3/4046* (2013.01); *G06T 2200/24* (2013.01)

(58) Field of Classification Search
None
See application file for complete search history.

(56) References Cited

U.S. PATENT DOCUMENTS 9,521,321 B1 12/2016 Kozko
10,469,744 B2 11/2019 Yim et al.
(Continued)

FOREIGN PATENT DOCUMENTS

KR 10-2017-0052673 A 5/2017
KR 10-2018-0060236 A 6/2018
(Continued)

OTHER PUBLICATIONS

VisualStrap, "Facebook panorama shooting allows you to publish 360-degree content—How to insert metadata after editing", Digital Marketing Insight, Jun. 24, 2016, 2 pages.

*Primary Examiner* — Tyler W. Sullivan
(74) *Attorney, Agent, or Firm* — Sughrue Mion, PLLC

(57) ABSTRACT

An electronic apparatus and method for performing image synthesis are provided. The electronic apparatus includes: a memory storing at least one instruction; and at least one processor configured to execute the at least one instruction. The electronic apparatus obtains a plurality of second front view images from a first front view image that are obtained by a front camera. The electronic apparatus obtains a front view ultra-wide angle image by synthesizing the plurality of second front view images. The electronic apparatus obtains a rear view ultra-wide angle image by synthesizing a plurality of rear view images. The electronic apparatus generates a 360-degree image by synthesizing the front view ultra-wide angle image and the rear view ultra-wide angle image.

20 Claims, 14 Drawing Sheets

(56) References Cited

U.S. PATENT DOCUMENTS

| | | | | |
|---|---|---|---|---|
| 10,587,800 | B2 | 3/2020 | Boyce et al. | |
| 10,666,922 | B2 | 5/2020 | Hwang et al. | |
| 10,805,530 | B2 | 10/2020 | Karpenko et al. | |
| 11,205,305 | B2 | 12/2021 | Sadi et al. | |
| 11,875,490 | B2 | 1/2024 | Lee et al. | |
| 2016/0028949 | A1 | 1/2016 | Lee et al. | |
| 2016/0088282 | A1 | 3/2016 | Sadi et al. | |
| 2020/0226716 | A1 | 7/2020 | Um et al. | |
| 2021/0333759 | A1* | 10/2021 | Vasavada | G04B 37/1486 |
| 2022/0207679 | A1 | 6/2022 | Lee et al. | |
| 2023/0076206 | A1 | 3/2023 | Liu et al. | |

FOREIGN PATENT DOCUMENTS

| | | | |
|---|---|---|---|
| KR | 10-1885777 | B1 | 8/2018 |
| KR | 10-2020-0080160 | A | 7/2020 |
| KR | 10-2157675 | B1 | 9/2020 |
| KR | 10-2022-0083830 | A | 6/2022 |
| KR | 10-2405428 | B1 | 6/2022 |

* cited by examiner

ELECTRONIC APPARATUS AND METHOD THEREOF FOR PERFORMING IMAGE SYNTHESIS

CROSS REFERENCE TO RELATED APPLICATIONS

This application is a by-pass continuation application of International Application No. PCT/KR2023/012858, filed on Aug. 30, 2023, which is based on and claims priority to Korean Patent Application Numbers 10-2022-0124663, filed on Sep. 29, 2022, and 10-2022-0186376, filed on Dec. 27, 2022, in the Korean Intellectual Property Office, the disclosures of which are incorporated by reference herein in their entireties.

TECHNICAL FIELD

The disclosed embodiments relate to an electronic apparatus and an operating method thereof, and more particularly, to an electronic apparatus configured to generate a panoramic image or a 360-degree image and an operating method of the electronic apparatus.

BACKGROUND

With the development of technologies, a technique of projecting a panoramic image or a 360-degree image onto a spherically or hemispherically shaped screen is being developed. A user may experience a virtual reality by using a panoramic image or a 360-degree image output to a display with a curved shape such as a sphere or a hemisphere.

SUMMARY

An electronic apparatus may include: a memory storing at least one instruction; and at least one processor configured to execute the at least one instruction to: obtain a plurality of second front view images from a first front view image that is obtained by a front camera, obtain a front view ultra-wide angle image by synthesizing the plurality of second front view images, obtain a rear view ultra-wide angle image by synthesizing a plurality of rear view images, and generate a 360-degree image by synthesizing the front view ultra-wide angle image and the rear view ultra-wide angle image.

The at least one processor being configured to execute the at least one instruction to obtain the plurality of second front view images from the first front view image may include being configured to execute the at least one instruction to obtain the plurality of second front view images by using a neural network. The plurality of second front view images may be images having features of rear view images obtained by a plurality of rear cameras. The neural network may be a learning model trained to generate, from one front view training image and a plurality of rear view training images, a plurality of front view training images respectively having features of the plurality of rear view training images, the plurality of rear view training images being obtained by a plurality of rear cameras.

The learning model may be further trained to minimize a loss between a plurality of ground truth images and the plurality of front view training images, the plurality of ground truth images being obtained by photographing a front face by using the plurality of rear cameras.

The features of the rear view images obtained by the plurality of rear cameras may include at least one of a camera lens feature or a geometry feature.

The camera lens feature may include at least one of a resolution, an optical magnification, an aperture, an angle of view, a pixel pitch, a dynamic range, or a depth.

The geometry feature may include at least one feature from among an angle of view relation, a size relation, and a position relation between the plurality of rear view images obtained by the plurality of rear cameras.

The plurality of rear view images may include at least two of a normal image, a wide angle image, or a telephoto image.

The electronic apparatus may further comprising a user input interface. The at least one processor may be further configured to execute the at least one instruction to: receive an input of at least one of a first reference signal or a second reference signal via the user input interface, generate, based on the first reference signal being received, the front view ultra-wide angle image based on a first area selected according to the first reference signal, and generate, based on the second reference signal being received, the rear view ultra-wide angle image based on a second area selected according to the second reference signal.

The electronic apparatus may further include a photographing unit including the front camera and a plurality of rear cameras, the plurality of rear cameras being configured to obtain the plurality of rear view images.

The electronic apparatus may further include a communication interface. The at least one processor may be further configured to execute the at least one instruction to, via the communication interface, receive the first front view image and the plurality of rear view images from a first user terminal and transmit the 360-degree image to the first user terminal.

An operating method of an electronic apparatus may include: obtaining a plurality of second front view images from a first front view image that is obtained by a front camera; obtaining a front view ultra-wide angle image by synthesizing the plurality of second front view images; obtaining a rear view ultra-wide angle image by synthesizing a plurality of rear view images; and generating a 360-degree image by synthesizing the front view ultra-wide angle image and the rear view ultra-wide angle image.

The obtaining the plurality of second front view images may include obtaining the plurality of second front view images from the first front view image by using a neural network. The plurality of second front view images may be images having features of rear view images obtained by a plurality of rear cameras. The neural network may be a learning model trained to generate, from one front view training image and a plurality of rear view training images, a plurality of front view training images respectively having features of the plurality of rear view training images, the plurality of rear view training images being obtained by a plurality of rear cameras.

The learning model may be further trained to minimize a loss between a plurality of ground truth images and the plurality of front view training images, the plurality of ground truth images being obtained by photographing a front face by using the plurality of rear cameras.

The features of the rear view images obtained by the plurality of rear cameras may include at least one of a camera lens feature or a geometry feature.

The camera lens feature may include at least one of a resolution, an optical magnification, an aperture, an angle of view, a pixel pitch, a dynamic range, or a depth.

The geometry feature may include at least one feature from among an angle of view relation, a size relation, and a position relation between the plurality of rear view images obtained by the plurality of rear cameras.

The plurality of rear view images may include at least two of a normal image, a wide angle image, or a telephoto image.

The operating method may further include receiving at least one of a first reference signal or a second reference signal. The obtaining the front view ultra-wide angle image may include generating, based on the first reference signal being received, the front view ultra-wide angle image based on a first area selected according to the first reference signal. The obtaining the rear view ultra-wide angle image may include generating, based on the second reference signal being received, the rear view ultra-wide angle image based on a second area selected according to the second reference signal.

The electronic apparatus may include the front camera, and the plurality of rear cameras. The operating method may further include: obtaining the first front view image by the front camera; and obtaining the plurality of rear view images by the plurality of rear cameras.

A non-transitory computer-readable recording medium may have recorded thereon a program executable by a computer to perform an operating method including: obtaining a plurality of second front view images from a first front view image that is obtained by a front camera; obtaining a front view ultra-wide angle image by synthesizing the plurality of second front view images; obtaining a rear view ultra-wide angle image by synthesizing a plurality of rear view images; and generating a 360-degree image by synthesizing the front view ultra-wide angle image and the rear view ultra-wide angle image.

DETAILED DESCRIPTION

Figure 1:
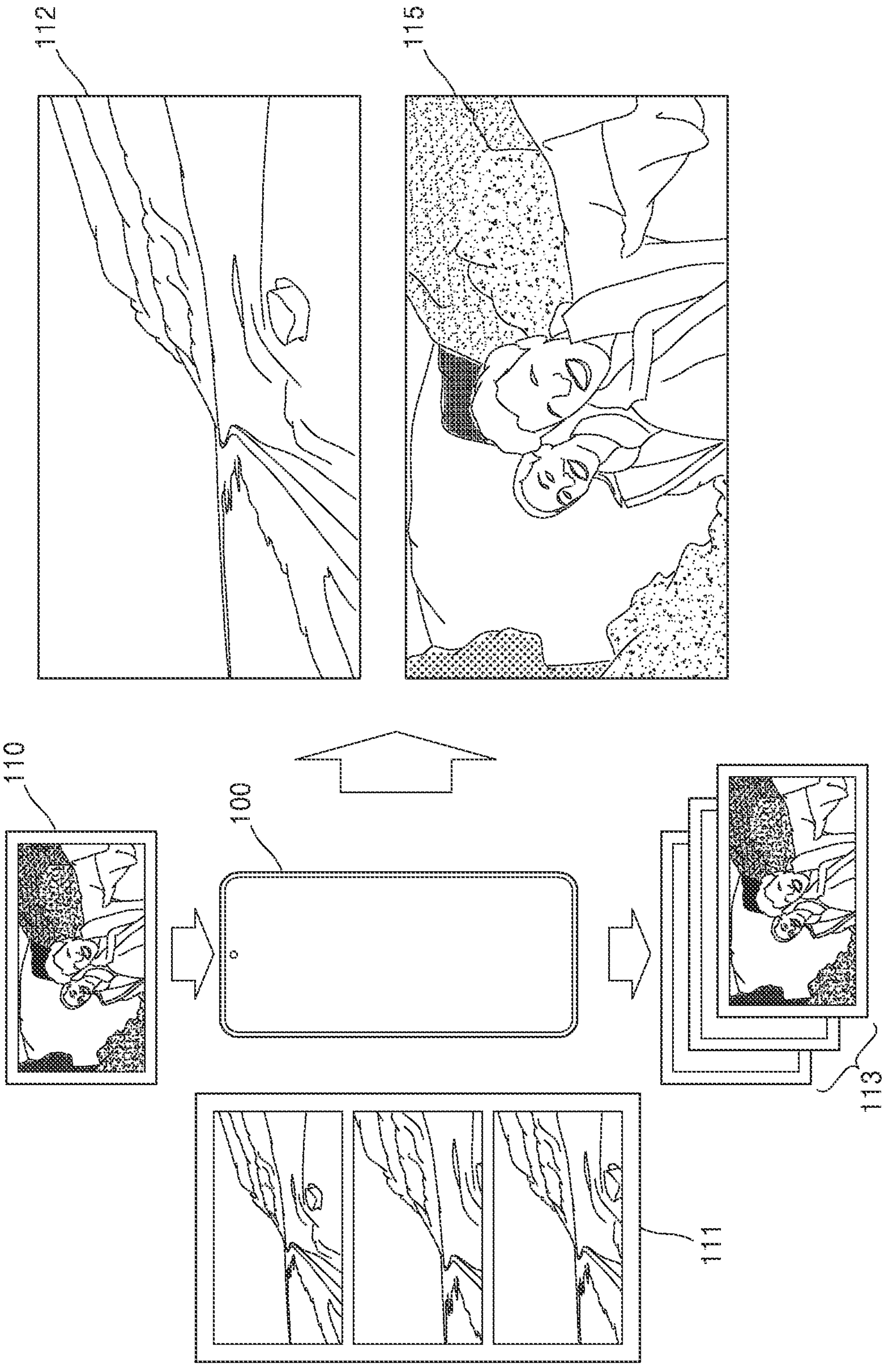
FIG. 1 is a diagram for describing an electronic apparatus generating a 360-degree image, according to an embodiment of the disclosure.

Throughout, the expression "at least one of a, b, or c" indicates only a, only b, only c, both a and b, both a and c, both b and c, all of a, b, and c, or variations thereof.

Hereinafter, embodiments will now be described more fully with reference to the accompanying drawings for one of ordinary skill in the art to be able to perform the disclosed embodiments without any difficulty. The disclosed embodiments may, however, be embodied in many different forms and should not be construed as being limited to the embodiments set forth herein.

The terms used are those general terms currently widely used in the art in consideration of functions in regard to the disclosed embodiments, but the terms may vary according to the intention of one of ordinary skill in the art, precedents, or new technology in the art. Thus, the terms used in the disclosed embodiments should not be understood as names of the terms but should be understood based on the meaning of the terms and content throughout.

Also, the terminology used is only for the purpose of describing a particular embodiment and is not intended to be limiting of the disclosed embodiments.

Throughout the specification, it will be understood that when an element is referred to as being "connected to" or "coupled with" another element, it can be directly connected to or coupled with the other element, or it can be electrically connected to or coupled with the other element by having an intervening element interposed therebetween.

The use of the terms "a", "an" and "the" and similar referents used in the specification, especially in the claims, are to be construed to cover both the singular and the plural. Also, operations of all methods described herein can be performed in any suitable order unless otherwise indicated herein or otherwise clearly contradicted by context. The disclosed embodiments are not limited to the described order of operations.

Throughout the specification, the expression "in some embodiments" or "in an embodiment" is described, but the expression does not necessarily indicate the same embodiment.

Some embodiments may be described in terms of functional block components and various processing steps. Some or all of the functional blocks may be realized by any number of hardware and/or software components configured to perform specified functions. For example, the functional blocks of the disclosed embodiments may be implemented by one or more processors or microprocessors, or may be implemented by circuit components for predetermined functions. In addition, for example, the functional blocks of the disclosed embodiments may be implemented with various programming or scripting languages. The functional blocks may be implemented as algorithms that are executed on one or more processors. Furthermore, the disclosed embodiments may employ any number of techniques according to the related art for, for example, electronics configuration, signal processing and/or data processing. The terms, such as, "mechanism", "element", "means", and/or "configuration" may be broadly used and are not limited to mechanical or physical elements.

Furthermore, connecting lines or connectors between elements shown in drawings are intended to represent exemplary functional connection and/or physical or logical connection between the elements. It should be noted that many alternative or additional functional connections, physical connections or logical connections may be present in a practical device.

Also, the terms such as "... unit," and/or "module," used in the disclosed embodiments indicate a unit, which processes at least one function or operation, and the unit may be implemented by hardware or software, or by a combination of hardware and software.

Also, in the specification, the term "user" refers to a person who uses an electronic apparatus, and may include a consumer, an evaluator, a viewer, a manager, or an installation engineer.

Hereinafter, the disclosed embodiments will now be described in detail with reference to the attached drawings.

FIG. 1 is a diagram for describing an electronic apparatus 100 generating a 360-degree image, according to an embodiment of the disclosure.

With the development of technologies, the use of metaverse content indicating a virtual space increases. The metaverse content may indicate a three-dimensional (3D) space platform where social, economic, educational, cultural, and scientific and technological activities as in the real world can be performed.

As user demand for the metaverse content increases, user demand for a curved-screen capable of outputting a panoramic image or a 360-degree image also increases. A user can experience a highly immersive virtual reality by using a panoramic image or a 360-degree image projected onto the curved-screen.

A panoramic image or a 360-degree image may be generated by using a dedicated photographing device equipped with a plurality of cameras. The dedicated photographing device may obtain a plurality of images of all directions by photographing in all horizontal directions and/or all vertical directions by using the plurality of cameras, and may generate a 360-degree image by stitching the plurality of images. However, the dedicated photographing device is very expensive, and thus, it is difficult for general users to easily use it.

With the development of technologies, as the use of a user terminal such as a smartphone having a plurality of cameras increases, a user can conveniently obtain images of a front view and a rear view of a user terminal by using the user terminal.

In this regard, the present application is to provide a technique of further easily obtaining a panoramic image or a 360-degree image by using a user terminal such as a smartphone.

Referring to FIG. 1, the electronic apparatus 100 may obtain an ambient image by using a camera.

The electronic apparatus 100 may be an apparatus equipped with a camera configured to obtain an image by photographing a target object. For example, the electronic apparatus 100 may be a user terminal such as a smartphone. The electronic apparatus 100 may be at least one of a mobile phone equipped with a camera, a video phone, an electronic-book (e-book) reader, a laptop personal computer (PC), a netbook computer, a digital camera, a personal multimedia assistant (PDA), a portable able multimedia player (PMP), a camcorder, a navigation device, a wearable device, a smart watch, a home network system, a security system, or a medical device, or any combination thereof.

A plurality of cameras may be provided in the electronic apparatus 100. The plurality of cameras may be provided in, for example, a front surface, a rear surface, and/or a side surface of the electronic apparatus 100. For example, one or more cameras may be provided in each of the front surface and the rear surface of the electronic apparatus 100.

FIG. 1 illustrates, as an example, a case where one front camera is mounted on the front surface of the electronic apparatus 100, and three rear cameras are mounted on the rear surface thereof.

The electronic apparatus 100 may obtain an image of a front view by photographing the front by using the front camera. Hereinafter, an image the electronic apparatus 100 obtains by photographing a target object positioned at the front by using the front camera is referred to as a first front view image 110.

A plurality of rear cameras may be mounted on the electronic apparatus 100. The electronic apparatus 100 may obtain a plurality of rear view images 111 of a rear view by photographing the rear by using the plurality of rear cameras.

The plurality of rear cameras may be cameras having different angles of view or different focal lengths. For example, in FIG. 1, three cameras provided in the rear surface of the electronic apparatus 100 may be a normal camera (a normal camera may also be referred to as a standard camera), a wide angle camera, and a telephoto camera, respectively.

The plurality of rear view images 111 obtained by photographing by using the plurality of rear cameras provided in the rear surface of the electronic apparatus 100 may each have a unique feature of a rear view image.

A feature of a rear view image obtained using a rear camera may include at least one of a camera lens feature or a geometry feature.

The camera lens feature may indicate a specification of a camera lens. The camera lens feature of the rear camera may include at least one of a resolution, an optical magnification, an aperture, an angle of view, a pixel pitch, a dynamic range, or a depth.

As each of the plurality of rear cameras has a different camera lens feature, the plurality of rear view images 111 obtained by the plurality of rear cameras may also have different image features. For example, an angle of view, a size and position of a target object included in an image, and/or a depth value may vary in each of the plurality of rear view images 111 obtained by the plurality of rear cameras. That is, even when the same target object is photographed by the plurality of rear cameras, different images may be obtained according to, for example, focal lengths, resolutions, and/or depth values of the cameras.

The geometry feature may be information indicating a relation of images obtained by the plurality of rear cameras.

The electronic apparatus 100 may obtain a plurality of front view images from one first front view image 110 obtained by the front camera. The plurality of front view images the electronic apparatus 100 obtains from the first front view image 110 may be equal to images obtained by photographing the front by using the plurality of rear cameras. That is, the electronic apparatus 100 may generate, from the first front view image 110, the plurality of front view images having features of rear view images obtained by the plurality of rear cameras. Hereinafter, front view images obtained from the first front view image 110 and having features of rear view images obtained by the plurality of rear cameras are referred to as second front view images 113.

For example, when the rear cameras are respectively a normal camera, a wide angle camera, and a telephoto camera, the second front view images 113 may be images obtained by respectively photographing the front at the same time by using the rear cameras that are the normal camera, the wide angle camera, and the telephoto camera.

The electronic apparatus 100 may generate the plurality of second front view images 113 from the first front view image 110 by using a neural network.

Each of the second front view images 113 may have image features according to lens feature of the plurality of rear cameras.

A geometry feature between the second front view images 113 may be equal to a geometry feature between the rear view images captured and obtained by the plurality of rear cameras.

The neural network the electronic apparatus 100 uses may be a learning model in the form of a deep neural network (DNN) trained to generate, from one front view training image and a plurality of rear view training images, a plurality of front view training images having features of rear view images obtained by the plurality of rear cameras.

Positions of a front camera 131 and rear cameras 141 may not be exactly symmetrical. When camera positions between the front camera 131 and the rear cameras 141 are different, a view difference may occur due to a positional difference.

The neural network may be a learning model trained to correct a view difference due to a positional difference between a front camera and a rear camera. The neural network may be a learning model trained to minimize a loss, the loss being between a plurality of ground truth images obtained by photographing the front by using a plurality of rear cameras and a plurality of front view training images.

The second front view images 113 generated by the completely-learned neural network may be images in which a view difference due to a positional difference between the front camera 131 and the rear cameras 141 is reflected. In more detail, the second front view images 113 may be images as if obtained by photographing the front at positions and arrangements of the rear cameras 141, i.e., views of the rear cameras 141.

The electronic apparatus 100 may obtain a front view ultra-wide angle image 115 by synthesizing the second front view images 113. As the front view ultra-wide angle image 115 is not a single image but is an image obtained by synthesizing the second front view images 113, the front view ultra-wide angle image 115 may be an ultra-high definition image having sufficient data.

The front view ultra-wide angle image 115 is obtained by smoothly synthesizing the second front view images 113, e.g., a telephoto image, a normal image, and a wide angle image, and may be the ultra-high definition image in which a view is smoothly movable to the telephoto image, the normal image, or the wide angle image when a user attempts to switch a view in the front view ultra-wide angle image 115.

As a switch to the telephoto image, the normal image, or the wide angle image in the front view ultra-wide angle image 115 is smooth, the front view ultra-wide angle image 115 may be the ultra-high definition image in which a movement or a rotation to a particular point is easy without causing degradation in image resolution even when a user zooms in or out with respect to the particular point or pans or tilts the image in a horizontal direction or a vertical direction.

The front view ultra-wide angle image 115 may be an image with an angle of view of 180 degrees or more, but the disclosed embodiments are not limited thereto.

The electronic apparatus 100 may obtain the rear view images 111 by photographing the rear by using the plurality of rear cameras at the same views where the first front view image 110 is obtained by using the front camera.

The electronic apparatus 100 may obtain a plurality of different rear view images 111 by photographing a target object positioned at the rear by using the plurality of rear cameras. For example, when cameras mounted on a rear surface of the electronic apparatus 100 are a normal camera, a wide angle camera, and a telephoto camera, the electronic apparatus 100 may obtain a normal image, a wide angle image, and a telephoto image of a rear view by using the plurality of rear cameras.

The electronic apparatus 100 may obtain a rear view ultra-wide angle image 112 by synthesizing the plurality of different rear view images 111 obtained by the plurality of rear cameras.

As the electronic apparatus 100 generates the rear view ultra-wide angle image 112 by synthesizing the plurality of different rear view images 111, not a single image, the rear view ultra-wide angle image 112 may be an ultra-high definition image having sufficient data.

The rear view ultra-wide angle image 112 is obtained by smoothly synthesizing the plurality of different rear view images 111, and may be the ultra-high definition image on which a smooth view switch between the plurality of different rear view images 111, i.e., the telephoto image, the normal image, or the wide angle image, is available, and zoom-in or zoom-out with respect to a particular point, and panning or tilting in a horizontal or vertical direction of the image are available.

The rear view ultra-wide angle image 112 may be an image with an angle of view of 180 degrees or more, but the disclosed embodiments are not limited thereto.

The electronic apparatus 100 may generate a wide image such as a panoramic image or a 360-degree image by synthesizing the front view ultra-wide angle image 115 and the rear view ultra-wide angle image 112.

As the front view ultra-wide angle image 115 and the rear view ultra-wide angle image 112 are each an ultra-high definition image, the panoramic image or the 360-degree image obtained by synthesizing the front view ultra-wide angle image 115 and the rear view ultra-wide angle image 112 may also be an ultra-high definition image.

The electronic apparatus 100 may detect an area overlapping between the front view ultra-wide angle image 115 and the rear view ultra-wide angle image 112, may stitch the overlapping area, and thus, may obtain the panoramic image or the 360-degree image.

A panoramic image may indicate a scheme of including an environment in a plurality of directions around the electronic apparatus 100 as one image or may indicate an image obtained by using the scheme. The panoramic image may indicate a scheme or an apparatus for including all scenes in a direction between 180 degrees and 360 degrees in an entire scene, or a photo or a picture which is obtained by using the scheme.

A 360-degree image may indicate a scheme of including an environment in 360 degrees around the electronic apparatus 100 as one image or may indicate an image obtained by using the scheme. The 360-degree image may be an image with an angle of view of 360 degrees. For example, the 360-degree image may be generated based on a plurality of images captured in 360-degree directions, by using at least one camera. The captured plurality of images may be mapped to a sphere, and contact points of the mapped images may be stitched to generate the 360-degree image in a sphere form.

The electronic apparatus 100 may further include a user input unit. The user input unit may be referred to as a user interface. The electronic apparatus 100 may receive, from a user via the user input unit, a selection of an area for which an ultra-wide angle image is to be generated.

The electronic apparatus 100 may receive, via the user input unit, a first reference signal for selecting a first area that is a reference to generate the front view ultra-wide angle image 115. When the electronic apparatus 100 receives an input of the first reference signal, the electronic apparatus 100 may generate the front view ultra-wide angle image 115, based on the first area selected according to the first reference signal. For example, the electronic apparatus 100 may generate the front view ultra-wide angle image 115 in which the first area is a center of the image.

The electronic apparatus 100 may receive, via the user input unit, a second reference signal for selecting a second area that is a reference to generate the rear view ultra-wide angle image 112. When the electronic apparatus 100 receives an input of the second reference signal, the electronic apparatus 100 may generate the rear view ultra-wide angle image 112, based on the second area selected according to the second reference signal. For example, the electronic apparatus 100 may generate the rear view ultra-wide angle image 112 in which the second area is a center of the image.

An external terminal that is not the electronic apparatus 100 may obtain the first front view image 110 and the plurality of rear view images 111. In this case, the electronic apparatus 100 may obtain the first front view image 110 and the plurality of rear view images 111 from the external terminal via a communication network.

The electronic apparatus 100 may obtain a second front view image 113 from the first front view image 110 received from the external terminal, and may obtain the front view ultra-wide angle image 115 from the second front view image 113. Also, the electronic apparatus 100 may generate the rear view ultra-wide angle image 112 from the plurality of rear view images 111 received from the external terminal. The electronic apparatus 100 may generate a panoramic image or a 360-degree image by synthesizing the front view ultra-wide angle image 115 and the rear view ultra-wide angle image 112. The electronic apparatus 100 may transmit the panoramic image or the 360-degree image back to the external terminal via a communication network.

As such, the electronic apparatus 100 may obtain a panoramic image or a 360-degree image, based on images obtained by using front and rear cameras.

Without an expensive dedicated device, a user may easily obtain a panoramic image or a 360-degree image by using the electronic apparatus 100 such as a smartphone, and may use the image.

The user may select a random point on a 360-degree image output to a screen of the electronic apparatus 100 or a curved screen, and may watch closely a virtual view of an area of the selected point. For example, the user may zoom in and enlarge the selected area and may watch the area. The generated 360-degree image is an ultra-high definition image and thus has sufficient data about a random area selected by the user, so that the generated 360-degree image may provide an enlarged image of the area without image-quality degradation even when the user zooms in the particular area.

Figure 2:
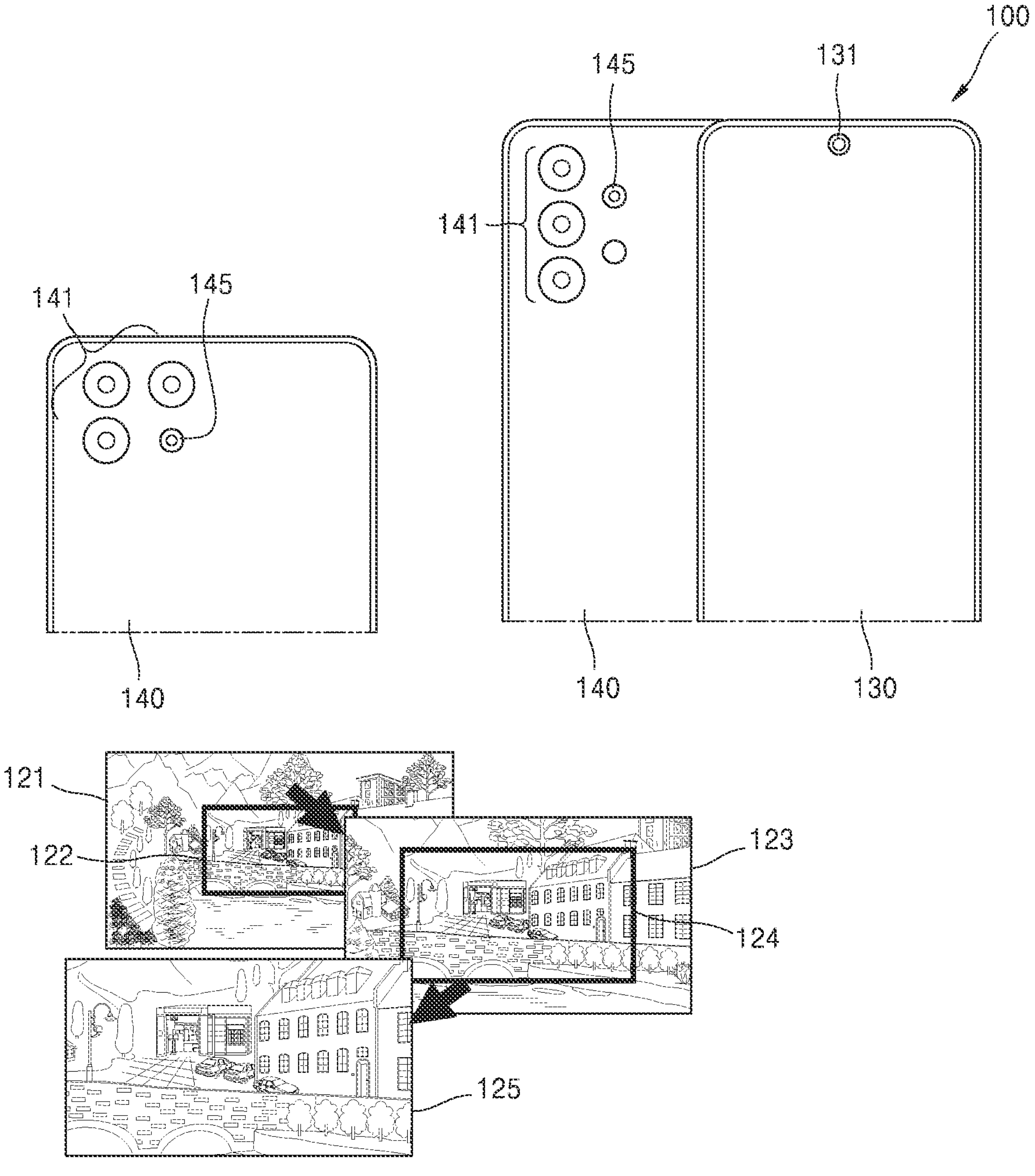
FIG. 2 illustrates a camera provided in an electronic apparatus, according to an embodiment of the disclosure.

FIG. 2 illustrates a camera provided in the electronic apparatus 100, according to an embodiment of the disclosure.

Referring to FIG. 2, the electronic apparatus 100 may include a plurality of cameras.

The camera may generate an image by photographing a target object, and may perform signal processing on the image. The camera may include an image sensor (not shown) and a lens (not shown). The camera may obtain an image of a target object by photographing the target object. The camera may photograph a user, thereby obtaining a frame or a video consisting of a plurality of frames.

A camera may be provided in each of a front surface 130 and a rear surface 140 of the electronic apparatus 100.

One front camera 131 may be provided in the front surface 130 of the electronic apparatus 100. However, the disclosed embodiments are not limited thereto, and a plurality of front cameras having different specifications may be provided in the front surface 130 of the electronic apparatus 100.

The front camera 131 may be positioned at a center of the top of the front surface 130. However, the disclosed embodiments are not limited thereto, and the front camera 131 may be positioned at various areas of the front surface of the electronic apparatus 100.

The electronic apparatus 100 may further include a depth sensor (not shown) as well as the front camera 131. The depth sensor may obtain a distance to a target object positioned at the front.

Alternatively, the front camera 131 provided in the front surface 130 of the electronic apparatus 100 may be a depth camera configured to support a depth function. For example, the front camera 131 including the depth sensor re-processes an image by performing a computation on the image received from the target object via the lens, thereby obtaining a stereoscopic image of an object, i.e., the target object.

The electronic apparatus 100 may include a plurality of rear cameras 141 at the rear surface 140.

The plurality of rear cameras 141 may be cameras having different angles of view or different focal lengths. The plurality of rear cameras 141 may be cameras having various focal lengths, such as a closeup camera, a normal camera, a wide angle camera, an ultra-wide angle camera, a telephoto camera, and/or a depth camera. For example, in FIG. 2, three rear cameras 141 at the rear surface 140 of the electronic apparatus 100 may be a normal camera, a wide angle camera, and a telephoto camera, respectively.

The plurality of rear cameras 141 may include a plurality of wide angle cameras having different angles of view, such as a first wide angle camera, and/or a second wide angle camera. Alternatively, the plurality of rear cameras 141 may include a plurality of telephoto cameras having different focal lengths of telephoto lenses, such as a first telephoto camera, and/or a second telephoto camera. For example, in FIG. 2, the plurality of rear cameras 141 provided in the rear surface 140 of the electronic apparatus 100 may be a wide angle camera, the first telephoto camera, and the second telephoto camera, respectively.

As illustrated in FIG. 2, the plurality of rear cameras 141 may be arrayed in a vertical line or arrayed in a triangle form at the top-left of the rear surface 140 of the electronic apparatus 100. However, this is merely an embodiment, and thus, the number of rear cameras 141 or how rear cameras 141 are arrayed may be variously changed.

In a rear view image 111 obtained by the plurality of rear cameras 141, a same target object may be photographed to have different angles of view, sizes, and positions. That is, even when the same target object is photographed by the plurality of rear cameras 141, different images may be obtained according to focal lengths of the rear cameras 141.

When the plurality of rear cameras 141 are a normal camera, a wide angle camera, and a telephoto camera, respectively, images the plurality of rear cameras 141 obtain by photographing a target object may be a normal image, a wide angle image, and a telephoto image, respectively. The normal image, the wide angle image, and the telephoto image may be represented in a manner that a range or an area where the target object is included, for example, a shape of the target object, a size of the target object, and/or perspective to the target object are different.

At the bottom of FIG. 2, an example of a plurality of rear view images 111 obtained by the plurality of rear cameras 141 is illustrated. In FIG. 2, a wide angle image 121 shows an image captured and thus obtained by the wide angle camera from among the rear cameras 141. The wide angle image 121 may be an image in which a target object is widely included and perspective is exaggerated so as to allow a distance to the target object to be longer than an actual distance.

In FIG. 2, a normal image 123 shows an image captured and thus obtained by the normal camera from among the rear cameras 141. The normal image 123 may be an image most similar to recognition by human eyes, in which distortion to a distance to a target object or a shape of the target object is very little.

In FIG. 2, a telephoto image 125 shows an image captured and thus obtained by the telephoto camera from among the rear cameras 141. In the telephoto image 125, a distant target object looks closer than the target object really is, and the target object that is enlarged may be included therein.

Each of the plurality of rear view images 111 may have a different rear view image feature.

Rear view images obtained by the different rear cameras 141 may have different image features according to camera lens features. The different image features according to the camera lens features may include at least one of a resolution, an optical magnification, an aperture, an angle of view, a pixel pitch, a dynamic range, or a depth.

The plurality of rear view images 111 may have different geometry features. The geometry feature may be information indicating a relation of the plurality of rear cameras or a plurality of rear view images obtained by the plurality of rear cameras.

For example, a first rectangular area 122 included in the wide angle image 121 may correspond to a second rectangular area 124 included in the normal image 123 or may correspond to an entire area of the telephoto image 125.

The geometry feature may be information indicating a difference or a relation occurring between images as the plurality of rear cameras have different focal lengths or different angles of view. The geometry feature may include features of a relation between the plurality of rear view images, the features including, for example, an angle of view, a size of a target object, and/or a position of the target object.

The electronic apparatus 100 may generate, by using a neural network, from the first front view image 110 that is one front view image obtained by the front camera 131, the second front view images 113 that are a plurality of front view images having features of rear view images obtained by the rear view cameras 141.

The neural network the electronic apparatus 100 uses may be a learning model in the form of a DNN trained to generate, from one front view training image and a plurality of rear view training images, a plurality of front view training images having features of rear view training images obtained by the plurality of rear cameras.

For example, the neural network may be a neural network trained to generate an image from one front training image obtained by a normal camera that is a front camera as if the image were obtained by a wide angle camera that is a rear camera or as if the image were obtained by a telephoto camera that is another rear camera.

The neural network may learn a relation between a plurality of rear view images obtained by the plurality of rear cameras 141. For example, when it is assumed that the neural network performs learning by using the wide angle image 121, the normal image 123, and the telephoto image 125 shown in FIG. 2 as training images, the neural network may learn features of each of the wide angle image 121, the normal image 123, and the telephoto image 125, and may also learn a relation between the wide angle image 121, the normal image 123, and the telephoto image 125.

The neural network may learn, from a relation between the wide angle image 121 and the normal image 123, a relation that the wide angle image 121 is upscaled and views of the wide angle image 121 are synthesized and rendered such that the normal image 123 is generated.

Also, the neural network may learn, from a relation between the normal image 123 and the telephoto image 125, a relation that the normal image 123 is zoomed in to be upscaled and views of the normal image 123 are synthesized and rendered such that the telephoto image 125 is generated.

A rear depth sensor 145 may be further provided as well as the plurality of rear cameras 141 at the rear surface 140 of the electronic apparatus 100. The rear depth sensor 145 may obtain a distance to a target object positioned at the rear.

Alternatively, the rear depth sensor 145 may not be separately provided in the rear surface 140 of the electronic apparatus 100 but one or more rear cameras from among the plurality of rear cameras 141 may be depth cameras each supporting a depth function. When the rear camera 141 is the depth camera, the rear camera 141 may obtain a distance to a target object by performing a computation on an image received via a lens from the target object, and may reprocess the image based on the distance, thereby obtaining the target object as a more stereoscopic image. A camera supporting a depth function may include, for example, a stereo type camera, a time-of-flight (ToF) scheme camera, and/or a structured pattern camera, according to a scheme of recognizing a three-dimensional (3D) depth.

Positions of the front camera 131 and the rear cameras 141 may not be exactly symmetrical. For example, as illustrated in FIG. 2, the front camera 131 may be positioned at a center of the top of the front surface 130, and the plurality of rear cameras 141 may be arrayed in a vertical line or arrayed in a triangle form at the top-left of the rear surface 140 of the electronic apparatus 100. In this case, as camera positions between the front camera 131 and the rear cameras 141 are different, a view difference may occur due to a positional difference.

When the electronic apparatus 100 obtains, from the first front view image 110, the second front view images 113 having features of rear view images obtained by the plurality of rear cameras, the electronic apparatus 100 may consider a view difference due to a positional difference between the front camera 131 and the plurality of rear cameras 141.

The electronic apparatus 100 may generate a rear view image obtained from the position and arrangement of the rear camera 141 from a front view image obtained by the front camera 131, i.e., the first front view image 110.

Figure 3:
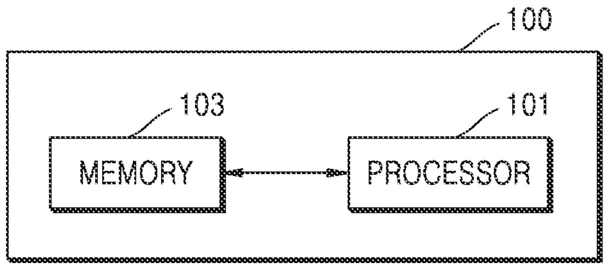
FIG. 3 illustrates an internal block diagram of an electronic apparatus according to an embodiment of the disclosure.

FIG. 3 illustrates an internal block diagram of the electronic apparatus 100 according to an embodiment of the disclosure.

Referring to FIG. 3, the electronic apparatus 100 may include a memory 103 storing one or more instructions, and at least one processor 101 configured to execute the one or more instructions stored in the memory 103.

The memory 103 may store at least one instruction. The memory 103 may store at least one program executable by the processor 101. Also, the memory 103 may store data input to the electronic apparatus 100 or output from the electronic apparatus 100.

The memory 103 may include at least one type of storage medium from among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, or an optical disc.

One or more instructions for obtaining the first front view image 110 may be stored in the memory 103.

One or more instructions for obtaining the second front view images 113 from the first front view image 110 may be stored in the memory 103. The second front view images 113 may be images generated from the first front view image 110 and may have features of rear view images obtained by the plurality of rear cameras.

One or more instructions for obtaining the front view ultra-wide angle image 115 by synthesizing the second front view images 113 may be stored in the memory 103.

One or more instructions for obtaining the rear view ultra-wide angle image 112 by synthesizing the plurality of rear view images 111 may be stored in the memory 103.

One or more instructions for generating a panoramic image or a 360-degree image by synthesizing the front view ultra-wide angle image 115 and the rear view ultra-wide angle image 112 may be stored in the memory 103.

At least one artificial intelligence (AI) model (a neural network model) may be stored in the memory 103. The neural network model stored in the memory 103 may be a neural network model to generate, from the first front view image 110 that is a front view image obtained by the front camera, the second front view images 113 that are a plurality of front view images having features of rear view images obtained by the rear view cameras.

The processor 101 may be configured to control all operations of the electronic apparatus 100 and a signal flow between internal elements of the electronic apparatus 100 and to process data.

The processor 101 may execute the one or more instructions stored in the memory to control the electronic apparatus 100 to operate.

The processor 101 may include a single core, a dual core, a triple core, a quad core, or a multiple core thereof.

The processor 101 may include one or more processors. For example, the processor 101 may include a plurality of processors. In this case, the processor 101 may be implemented as a main processor and a sub processor.

Also, the processor 101 may include at least one of a central processing unit (CPU), a graphics processing unit (GPU), or a video processing unit (VPU). The processor 101 may be implemented in the form of a system on chip (SoC) which integrates at least one of the CPU, the GPU, or the VPU. The processor 101 may further include a neural processing unit (NPU).

The processor 101 may process input data, according to a predefined operation rule or the AI model. The predefined operation rule or the AI model may be generated by using a particular algorithm. Also, the AI model may be obtained by training a particular algorithm.

The at least one processor 101 may obtain the first front view image 110 by executing one or more instructions. The first front view image 110 may be an image of a front view which is obtained by photographing the front by using the front camera.

The at least one processor 101 may execute the one or more instructions to obtain, from the first front view image 110, the plurality of second front view images 113 having features of rear view images.

The at least one processor 101 may obtain the plurality of second front view images 113 from the first front view image 110, based on a rule or an AI algorithm.

The at least one processor 101 may use, as the AI algorithm, at least one of machine learning, a neural network, or a deep learning algorithm. For example, the at least one processor 101 may obtain the plurality of second front view images 113 from the first front view image 110, by using the neural network.

An AI technique may consist of machine learning (deep learning) and element techniques using machine learning. The AI technique may be implemented using an algorithm. The algorithm or a set of algorithms for implementing the AI technique is referred to as a neural network. The neural network may receive an input of input data, may perform a computation for analysis and classification, and thus, may output resultant data. In this manner, in order for the neural network to correctly output the resultant data corresponding to the input data, there is a need to train the neural network. That the neural network is trained means that an AI model having a desired feature is made by applying a learning algorithm to a plurality of pieces of training data. The training may be performed by the electronic apparatus 100 itself where AI is performed or may be performed via a separate server/system.

The learning algorithm is a scheme of training a preset target device (e.g., a robot) by using a plurality of pieces of training data, such that the preset target device can autonomously make a decision or prediction. Examples of the learning algorithm may include supervised learning, unsupervised learning, semi-supervised learning, and reinforcement learning, but the learning algorithm is not limited to the examples, unless expressly described otherwise.

A set of algorithms for allowing output data corresponding to input data to be output via a neural network, software for executing the set of algorithms, and/or hardware for executing the set of algorithms may be referred to as 'AI model' (or, a neural network model or a neural network).

A neural network used by the processor 101 may be software for executing an algorithm or a set of algorithms for obtaining the second front view images 113 from the first front view image 110 and/or hardware for executing the set of algorithms.

The neural network may be a DNN including two or more hidden layers.

The neural network may be trained to receive an input of input data, perform a computation for analysis and classification, and output resultant data corresponding to the input data.

The neural network may be trained to generate a plurality of front view training images having features of a plurality of rear view images obtained by a plurality of rear cameras, by receiving, as a plurality of pieces of training data, an input of various front view training images and a plurality of rear view training images corresponding thereto, and applying a learning algorithm to the plurality of pieces of training data.

The neural network may learn features of the plurality of rear view training images. The features of the plurality of rear view images may include at least one of a camera lens feature or a geometry feature.

The camera lens feature may be a feature of each rear view image according to at least one feature from among a resolution, an optical magnification, an aperture, an angle of view, a pixel pitch, a dynamic range, and a depth of each of the plurality of rear cameras.

The geometry feature may include at least one feature from among an angle of view relation, a size relation, and a position relation between the plurality of rear view images.

The neural network may be trained to obtain a front view image feature from a front view training image, to modify the front view image feature according to features of a plurality of rear view images obtained by the plurality of rear cameras, and then to generate, from the front view training image, a plurality of front view training images having the features of the plurality of rear view images obtained by the plurality of rear cameras.

The neural network may be trained to compare the generated plurality of front view training images with ground truth images and then to minimize a loss between the images. The ground truth images may be a plurality of images obtained by photographing the front by using the plurality of rear cameras. The neural network may be trained to minimize the loss between the ground truth image and the plurality of front view training images, thereby learning a view difference according to a positional difference between the front camera and the rear camera.

The learning may be performed by the electronic apparatus 100 by itself where AI is performed or may be performed via a separate server/system.

The completely-learned neural network may be embedded in the electronic apparatus 100. The electronic apparatus 100 may be an apparatus in the form of on-device in which an AI function of the neural network is added to an edge device such as a smartphone. For example, the electronic apparatus 100 may obtain the second front view images 113 from the first front view image 110 by using the neural network included in the electronic apparatus 100, without interoperation with a separate server. As the electronic apparatus 100 autonomously collects, calculates, and processes information without using a cloud server, the electronic apparatus 100 may rapidly obtain, from the first front view image 110, the second front view images 113 in which a feature of a rear view image obtained by the rear camera is reflected.

Alternatively, the completely-learned neural network may be built in, for example, a cloud server, and/or an external computing device. For example, the electronic apparatus 100 may not in the form of on-device but may interoperate with a cloud server or a cloud computing device and thus may obtain a 360-degree image. In this case, the electronic apparatus 100 may obtain the first front view image 110 by the front camera 131 and the plurality of rear view images 111 by the plurality of rear cameras 141 and may transmit them to an external server.

The external server may receive the first front view image 110 from the electronic apparatus 100 and may generate the second front view images 113 from the first front view image 110 by using the neural network described above. The external server may generate the front view ultra-wide angle image 115 by synthesizing the second front view images 113, and may generate the rear view ultra-wide angle image 112 by synthesizing the plurality of rear view images 111. The external server may generate a panoramic image or a 360-degree image by synthesizing the front view ultra-wide angle image 115 and the rear view ultra-wide angle image 112 and may transmit it to the electronic apparatus 100.

The electronic apparatus may output the 360-degree image received from the external server.

Figure 4:
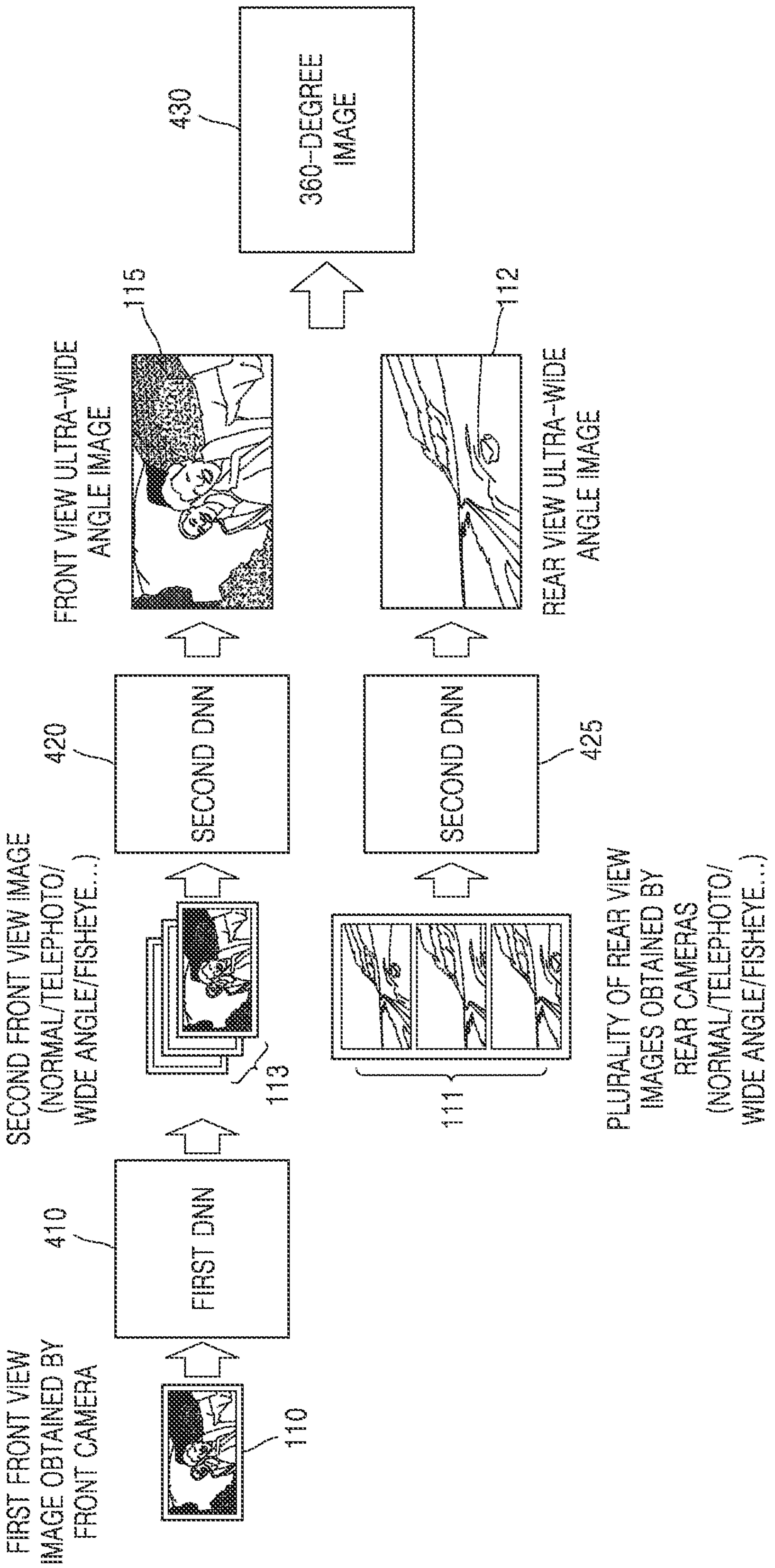
FIG. 4 illustrates an operation in which an electronic apparatus generates a 360-degree image, according to an embodiment of the disclosure.

FIG. 4 illustrates an operation in which the electronic apparatus 100 generates a 360-degree image, according to an embodiment of the disclosure.

The electronic apparatus 100 may obtain the first front view image 110. The electronic apparatus 100 may obtain the first front view image 110 by photographing a target object positioned at the front by using the front camera 131 provided in a front surface of the electronic apparatus 100. Alternatively, the electronic apparatus 100 may receive, from an external user terminal, the first front view image 110 obtained by a front camera provided in the external user terminal.

The electronic apparatus 100 may obtain the second front view images 113 from the first front view image 110 by using a first DNN 410. The first DNN 410 is an artificial neural network including a plurality of hidden layers between an input layer and an output layer, and may have been pre-trained.

The first DNN 410 may be a learning model trained to generate, from one front view training image and a plurality of rear view training images, a plurality of front view training images having features of rear view images obtained by the plurality of rear cameras.

The second front view images 113 generated from the first front view image 110 by the first DNN 410 may be front view images having features of rear view images as if the front view images were obtained by photographing the front by the plurality of rear cameras.

The electronic apparatus 100 may generate the front view ultra-wide angle image 115 by synthesizing the second front view images 113. The electronic apparatus 100 may generate the front view ultra-wide angle image 115 from the second front view images 113 by using a second DNN 420.

The second DNN 420 may also be a DNN including two or more hidden layers. The second DNN 420 may be a neural network trained to synthesize images. The second DNN 420 may be an algorithm for detecting a similar area or feature between a plurality of images and obtaining an ultra-wide angle image by matching and synthesizing images, or software for executing the algorithm or a set of algorithms and/or hardware for executing a set of algorithms.

The second DNN 420 may smoothly synthesize the second front view images 113 having features of rear view images obtained by rear cameras, e.g., a plurality of images having features of a telephoto image, a normal image, and a wide angle image, thereby generating an ultra-high definition image on which a view is smoothly movable between the telephoto image, the normal image, and the wide angle image.

The electronic apparatus 100 may obtain the plurality of different rear view images 111. The electronic apparatus 100 may obtain the plurality of rear view images 111 by photographing a target object positioned at the rear by using the rear cameras 141 provided in the rear surface, at the same time when the electronic apparatus 100 obtains the first front view image 110 by the front camera 131 of the electronic apparatus 100. Alternatively, the electronic apparatus 100 may receive, from an external user terminal, the rear view image 111 obtained by a rear camera provided in the external user terminal.

The electronic apparatus 100 may generate the rear view ultra-wide angle image 112 from the plurality of rear view images 111 by using a second DNN 425. The second DNN 425 may be a DNN trained to synthesize images, like the first DNN 410.

The second DNN 425 may smoothly synthesize the plurality of rear view images 111, e.g., telephoto images, normal images, and wide angle images, thereby generating an ultra-high definition image on which a view movement between the images is smoothly performable. The rear view ultra-wide angle image 112 may be the ultra-high definition image on which a movement or a rotation to a particular point is easy without causing degradation in an image resolution even when a user zooms in or out the particular point or pans or tilts the image in a horizontal direction or a vertical direction.

The electronic apparatus 100 may generate a 360-degree image 430 by synthesizing the front view ultra-wide angle image 115 and the rear view ultra-wide angle image 112. The electronic apparatus 100 may detect similar feature points in the front view ultra-wide angle image 115 and the rear view ultra-wide angle image 112, may stitch the front view ultra-wide angle image 115 and the rear view ultra-wide angle image 112 by matching the similar feature points, and thus, may obtain the 360-degree image 430.

Figure 5:
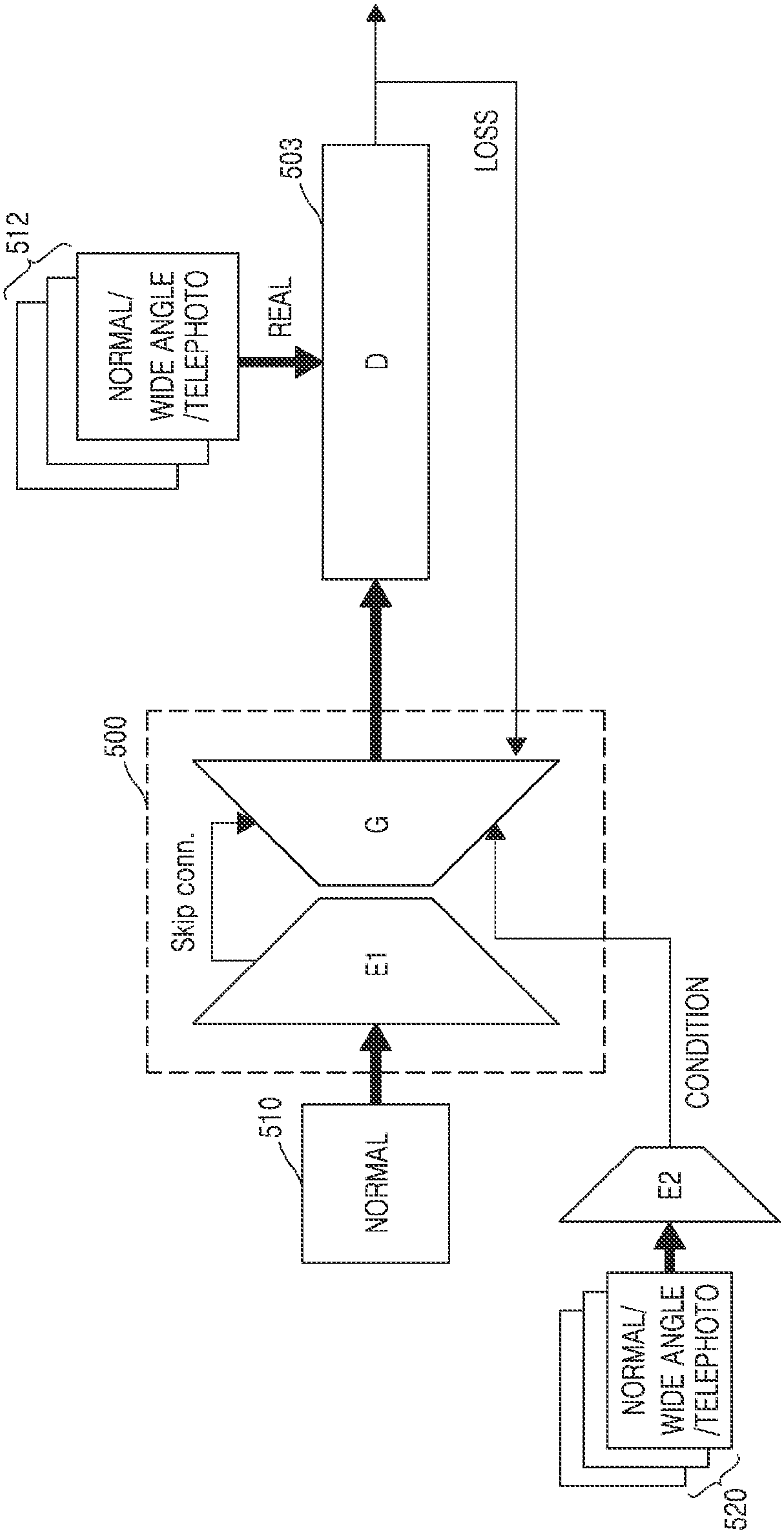
FIG. 5 is a diagram for describing obtaining of a learning model, according to an embodiment of the disclosure.

FIG. 5 is a diagram for describing obtaining of a learning model, according to an embodiment of the disclosure.

Referring to FIG. 5, a neural network 500 may receive an input of a plurality of pieces of training data.

The neural network 500 may learn a method of obtaining, from training data, a plurality of front view training images having features of a plurality of rear view images obtained by a plurality of rear cameras, and may be generated as a learning model based on a result of the learning.

The training data may include photograph images obtained by photographing a target object with various sizes and at positions when the target object having the various sizes is at various positions. The photograph images may include a front view image obtained by photographing the target object by using a front camera and a plurality of rearview images obtained by photographing the target object at one time by using a plurality of rear cameras.

The training data may include a front view training image 510. A normal image may be a photograph image of a front view which is obtained by the front camera, when the front camera is a normal camera.

The front view training image 510 may be input to a neural network 500.

The neural network 500 may be an encoder-decoder model. The encoder-decoder model may include an encoder E1 and a decoder G. The encoder-decoder model may be a model designed to extract a feature from an image and well reflect the extracted feature to an image to be generated. The encoder-decoder model may include, for example, U-Net, Residual U-Net, and/or FD U-Net. However, this is merely an embodiment, and the neural network 500 is not limited to the encoder-decoder model.

The neural network 500 may be trained based on a plurality of training images, such that values of a plurality of weights to be respectively applied to a plurality of nodes constituting the neural network 500 are set. The weight may refer to a connection strength between the nodes of the neural network 500. The weight may be optimized through repeated training, and may be repeatedly modified until the accuracy of a result satisfies a certain reliability level. For example, the weight may be repeatedly modified until an image output from the neural network 500 becomes equal to a ground truth image.

The encoder E1 included in the neural network 500 may decrease a dimension while increasing the number of channels so as to detect a feature of an input image. The decoder G included in the neural network 500 may decrease the number of channels and increase a dimension by using information encoded at a low dimension, and thus, may generate an image of a high dimension. The decoder G may also be referred to as a generator.

The front view training image 510 may be input to the encoder E1 of the neural network 500. The encoder E1 may decrease a dimension of the front view training image 510 while compressing information thereof, and thus, may obtain an important feature from the front view training image 510.

In general, in an encoding stage, a dimension is decrease while the number of channels is increased so as to detect a feature of an input image, and in a decoding stage, the number of channels is decreased and a dimension is increased by using only information encoded at a low dimension such that an image of a high dimension may be reconstructed. However, in the encoding stage, important information from among information about a target object included in an image may be lost, and in the decoding stage, the lost important information may not be recovered as only information of a low dimension is used.

Accordingly, the encoder-decoder model may use skip connection so as to simultaneously extract a feature of an image by using not only low-dimension information but also using high-dimension information and use important information. The skip connection may indicate that an encoder layer and a decoder layer are directly connected, and thus, a feature obtained at each layer in the encoding stage is concatenated to each layer of the decoding stage. When an encoder and a decoder included in the encoder-decoder model are symmetrical to each other, the skip connection may be used to improve performance of the decoder G by directly transmitting information to a corresponding layer of the decoder, instead of transmitting the information to another layer.

Training data may include a rear view training image 520. The rear view training image 520 may be an image obtained by a rear camera at the same time when the front view training image 510 is obtained or may be an image generated to have a rear view image feature of the rear camera. When the rear camera is provided in a multiple number, the rear view training image 520 obtained by the rear camera may also be obtained in a multiple number. For example, when the rear camera includes a normal camera, a wide angle camera, and a telephoto camera, the rear view training image 520 may also include a normal image, a wide angle image, and a telephoto image.

The training data may further include front distance information obtained by a front depth sensor. The front distance information may be information indicating a distance to a target object positioned at the front. The front distance information may be obtained by a front camera generating a front view image or from the front view image, or may be obtained from the front depth sensor separately from the front camera. When the front depth sensor is provided in a multiple number, the front distance information may also be obtained in a multiple number.

When the training data further includes the front distance information obtained by the front depth sensor, the front distance information may be input together with the front view training image 510 to the encoder E1 of the neural network 500. The encoder E1 may decrease a dimension of the front view training image 510 and the front distance information while compressing information thereof, and thus, may obtain an important feature from the front view training image 510.

The training data may further include rear distance information obtained by the rear depth sensor. The rear distance information may be information indicating a distance to a target object positioned at the rear. The rear distance information may be obtained from a rear camera or a rear view image, or may be obtained from the rear depth sensor separately from the rear camera. When the rear camera is provided in a multiple number and/or the rear depth sensor is provided in a multiple number, the rear distance information obtained from the rear camera or the rear depth sensor may also be provided in a multiple number.

A dimension of the rear view training image 520 may be decreased and thus the rear view training image 520 may be compressed by an encoder E2. When there is the rear distance information, the rear distance information may also be compressed by the encoder E2. As the encoder E1 included in the encoder-decoder model, the encoder E2 may compress data by increasing the number of channels while decreasing a dimension. The data compressed by the encoder E2 may be a rear camera feature obtained from the rear view training image 520 and/or the rear distance information. The rear camera feature may include at least one of an image feature due to a lens feature of each of the rear cameras, or a geometry feature due to a positional difference or an array difference between the rear cameras.

The data compressed by the encoder E2 may be input in the form of a condition to the decoder G. The condition may be information indicating a condition by which the decoder G generates an image.

The data being input as the condition to the decoder G may be data including camera features of the rear cameras and a geometry feature between the rear cameras.

The decoder G may be a generator to generate a high-dimension image by decreasing the number of channels and increasing a dimension by using information encoded at a low dimension. When the decoder G generates a new image by using compression information received from the encoder E2, that is, an important feature about the front view training image 510 and the front distance information, the decoder G may receive an input of the rear camera feature as the condition and may generate an image according to the condition.

The decoder G may generate a new image by considering compression data about the front view training image 510 and the front distance information received from the encoder E1, and the rear camera features received from the encoder E2, for example, the lens feature of each of the normal camera, the wide angle camera, and the telephoto camera, a positional relation between the rear cameras, and/or depth information to a target object. The generated new image may be a training image having features of rear view images obtained by a plurality of rear cameras. That is, the new image may be the training image having the lens features of the plurality of rear cameras and a geometry feature between the plurality of rear cameras.

A plurality of training images generated by the decoder G may be compared with ground truth images 512 via a discriminator D 503. Ground truth images may be training images obtained by photographing the front by the plurality of rear cameras.

The discriminator 503 may compare the images generated by the decoder G with the ground truth images 512, thereby obtaining a difference between the images as a loss. The loss obtained by the discriminator 503 may be forwardly fed back to the neural network 500, and thus, may be used to train weights of nodes forming the neural network 500.

Weights of the neural network 500 may be repeatedly set to be optimized until the loss becomes minimal. The neural network 500 may be formed by weight values that are finally set.

An operation of learning a method of generating, from a front view image by using the neural network 500, a plurality of front view images having features of rear view images obtained by rear cameras may be previously performed. In a certain case, as some of a plurality of training images are modified, the neural network 500 may be updated. In a certain case, a new training image may be used at regular intervals. When the new training image is added, the neural network 500 may re-learn a method of generating, from an image, a plurality of images having features of rear view images obtained by rear cameras, such that a learning model may be updated.

The operation of learning the method of generating, from a front view image by using the neural network 500, a plurality of front view images having features of rear view images obtained by rear cameras may be performed by the processor 101 in the electronic apparatus 100 of FIG. 3, but is not limited thereto and thus may be performed by an external server or an external computing device coupled with the electronic apparatus 100 via a communication network. The operation of learning the method of generating a plurality of images by using the neural network 500 may request a relatively complicated computation. In this case, the external computing device separate from the electronic apparatus 100 may perform the learning operation, and the electronic apparatus 100 may receive a learning model from the external computing device, such that a computation to be performed by the electronic apparatus 100 may be decreased.

Alternatively, the completely-learned neural network 500 may be stored in the electronic apparatus 100 or may be stored in an external cloud server or computing device other than the electronic apparatus 100, and may generate a plurality of images based on an image received from the electronic apparatus 100.

Figure 6:
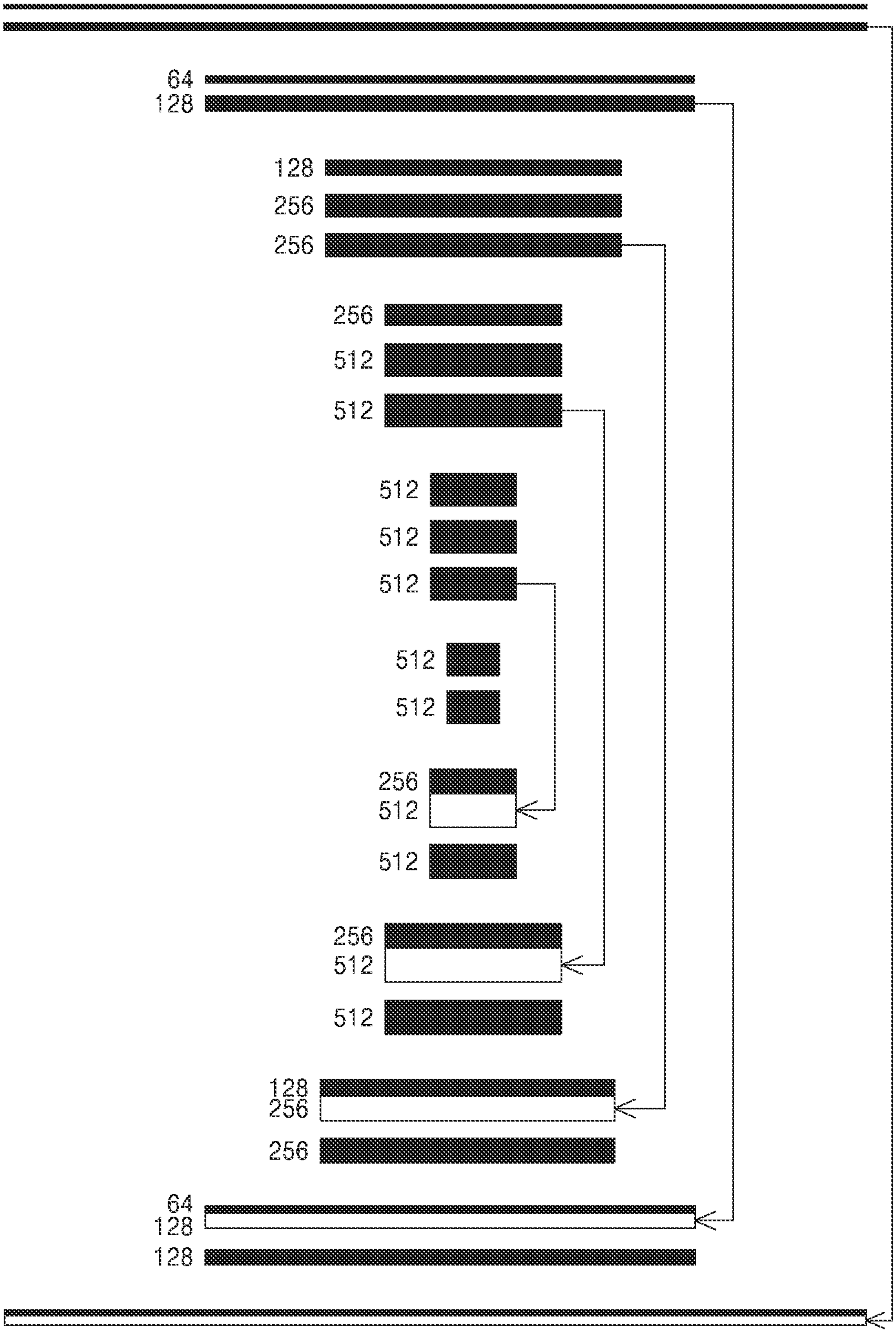
FIG. 6 is a diagram for describing architecture of an encoder-decoder model according to an embodiment of the disclosure.

FIG. 6 is a diagram for describing architecture of an encoder-decoder model according to an embodiment of the disclosure.

Referring to FIG. 6, the encoder-decoder model of FIG. 6 may be an example of the neural network 500 of FIG. 5. The encoder-decoder model may have the architecture in which an encoder is included in an upper part and a decoder is included in a lower part. The architecture of the encoder-decoder model may include a neural network without fully connected layers.

The encoder-decoder model may consist of a contracting path for obtaining a feature from an image and an expanding path for expansion in a symmetrical manner thereto. All operations of the contracting path may follow general architecture of a convolution network using alternating convolution and pooling task, may gradually downsample a feature map, and thus, may simultaneously increase the number of feature maps per layer. That is, the encoder may include a plurality of convolutional layers, and a Rectified Linear Unit (ReLU) activation function and a max pooling operation are sequentially performed on each layer, such that a feature map may be decreased.

In FIG. 6, a square block, that is, a rod indicates a multi-channel feature map that passes a series of conversions. A height of the rod indicates a relative map size of a pixel unit and a width thereof is proportional to the number of channels. All convolutional layers each have a 3×3 kernel, and a number beside each rod indicates the number of channels. A first convolutional layer generates 64 channels, and then generates, as a network deepens, doubled channels until the number of channels reaches 512 after each max pooling task. A single convolutional layer of 512 channels functions as a bottleneck central part of a network which divides the encoder and the decoder.

The number of channels gradually increases in the upper encoder and gradually decreases in the lower decoder.

All operation of the expanding path may consist of upsampling of a feature map and convolution thereafter, and thus, may increase a resolution of an output image. The decoder may include a transposed convolutional layer that decreases the number of channels in half and doubles a size of a feature map. An output of the transposed convolutional layer is connected to an output of a corresponding part of the decoder. A resultant feature map is processed by a convolution operation so as to maintain the number of channels to be equal to a symmetrical encoder term. This upsampling process is repeated as much as the number of pooling of the encoder so as to make pairs with respect to the pooling of the encoder.

In FIG. 6, an arrow connecting the encoder and the decoder with each other indicates skip connection by which each encoding layer of the encoder transmits information and thus is connected to each corresponding decoding layer of the decoding.

In order to prevent a case in which, in an encoding stage, an important feature such as detailed position information about a target object in an image, may be lost while a dimension is decreased, and in a decoding stage, the important feature may not be recovered as only low-dimension information is used, the skip connection may be used. When the skip connection is used, it is possible to extract a feature of an image by using not only low-dimension information but also using high-dimension information and simultaneously to detect an important feature, e.g., an accurate position.

To this end, the encoder-decoder model may use a method by which features obtained from each layer in the encoding stage are concatenated with each layer in the decoding stage. Direct connection between an encoder layer and a decoder layer is referred to as the skip connection. The skip connection refers to a scheme in which an output from one layer is not input to a next layer but is added to an input to a layer after few layers are skipped, unlike a scheme in which only an output from a previous layer is used as an input to a next layer.

The decoder may concatenate a feature from the contracting path with a high-resolution feature via the skip connection in the expanding path, thereby localizing an upsampled feature.

Figure 7:
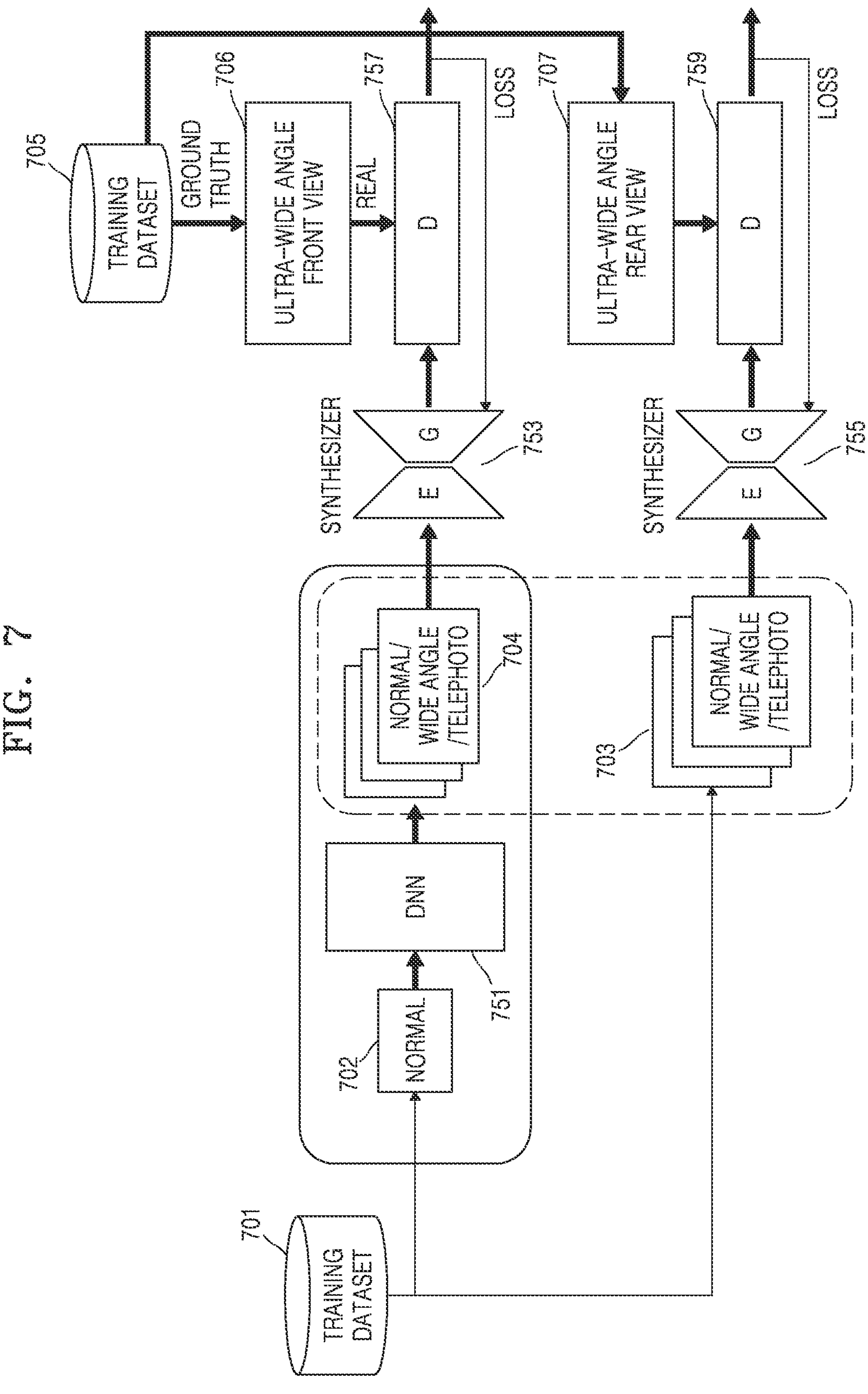
FIG. 7 is a diagram for describing obtaining of a learning model, according to an embodiment of the disclosure.

FIG. 7 is a diagram for describing obtaining of a learning model, according to an embodiment of the disclosure.

Referring to FIG. 7, a front view training image 702 may be input to a DNN 751. The DNN 751 may be a neural network including two or more hidden layers.

The DNN 751 may be trained to receive an input of input data, to perform a computation for analysis and classification, and then to output resultant data corresponding to the input data.

The DNN 751 may be trained to receive, as a plurality of pieces of training data, an input of various front view training images and a plurality of rear view training images corresponding thereto, to apply a learning algorithm to the plurality of pieces of training data, and then to generate a plurality of front view training images having features of a plurality of rear view images obtained by a plurality of rear cameras.

A training dataset 701 may be a database including a front view training image 702 and a plurality of rear view training images 703 as one set.

The DNN 751 may obtain, from the training dataset 701, the front view training image 702 as training data.

The DNN 751 may learn a method of inferring, from training data, a front view training image having a feature of a rear view image obtained by a rear camera, in response to the training data being input.

The front view training image 702 may be a training image having a feature of an image obtained by a front camera. For example, when the front camera is a normal camera, the front view training image 702 may be an image obtained by a front normal camera or may be an image generated to satisfy the specification of the front normal camera.

The plurality of rear view training images 703 may be images generated by being captured by a plurality of rear cameras at the same time as the front view training image 702. Alternatively, the plurality of rear view training images 703 may be images generated to satisfy the specification of the plurality of rear cameras. For example, the plurality of rear view training images 703 may be images having image features according to various features of each of the plurality of rear cameras, the various features including camera specifications, e.g., an angle of view, a focal length, a resolution, a dynamic range, and/or an image quality.

The DNN 751 may classify and analyze a plurality of pieces of input data by using the front view training image 702 obtained from the training dataset 701 as an input value, and thus, may extract the features. The DNN 751 may learn a method of obtaining, from training data, a plurality of front view training images having features of a plurality of rear view images obtained by a plurality of rear cameras, and may be generated as a learning model based on a result of the learning.

The DNN 751 may be trained to zoom in and upscale the front view training image 702 having a feature of a normal image obtained by a normal camera, thereby generating, from the front view training image 702, a front view image having a feature of a telephoto image obtained by a telephoto camera.

The DNN 751 may be trained to generate a front view image having a feature of a wide angle image obtained by a wide angle camera, by generating a part not seen on the normal image, from the front view training image 702 having the feature of the normal image obtained by the normal camera. The DNN 751 may be trained to generate an image of a boundary by extrapolating data of the front view training image 702 or to generate an appropriate image for a boundary of the normal image, based on training images having various geometry structures from the training dataset 701.

A plurality of front view training images 704 generated by the DNN 751 may be synthesized by a first synthesizer 753.

The first synthesizer 753 may be a neural network model. For example, the first synthesizer 753 may be the encoder-decoder model but is not limited thereto.

The first synthesizer 753 may generate a front view ultra-wide angle training image by synthesizing the plurality of front view training images 704. The first synthesizer 753 may extract, as a feature point, a point having a minimum difference between pixels in the plurality of front view training images 704. The first synthesizer 753 may stitch corresponding feature points from among extracted feature points, thereby generating one front view ultra-wide angle training image.

The front view ultra-wide angle training image generated by the first synthesizer 753 may be compared, by a discriminator D 757, with a front view ultra-wide angle training image 706 that is a ground truth image.

The ground truth image may be obtained from a training dataset 705. The training dataset 705 may be a database storing the front view ultra-wide angle training image 706 and a rear view ultra-wide angle training image 707. The training dataset 705 may be the same database as the training dataset 701 storing the front view training image 702 and the plurality of rear view training images 703 but is not limited thereto and may be a separate database.

The discriminator 757 may obtain a loss between images by comparing the front view ultra-wide angle training image generated by the first synthesizer 753 with the front view ultra-wide angle training image 706 that is the ground truth image from the training dataset 705, may forwardly feed the loss back to the first synthesizer 753, and thus, may allow weights of nodes constituting the first synthesizer 753 to be trained. The weights of the first synthesizer 753 may be repeatedly set until the loss becomes minimal.

The plurality of rear view training images 703 may be synthesized by a second synthesizer 755. The second synthesizer 755 may also be the encoder-decoder model but is not limited thereto.

The second synthesizer 755 may detect feature points in the plurality of rear view training images 703, may match and stitch the feature points, and thus, may generate one rear view ultra-wide angle training image.

A discriminator 759 may obtain a rear view ultra-wide angle training image 707 that is a ground truth image from the training dataset 705, may compare the rear view ultra-wide angle training image 707 with the rear view ultra-wide angle training image generated by the second synthesizer 755, and thus, may obtain a loss that is a difference between the images. The discriminator 759 may forwardly feed the loss back to the second synthesizer 755, and thus, may allow weights of nodes constituting the second synthesizer 755 to be trained. The weights of the second synthesizer 755 may be formed by weight values that are repeatedly set until the loss becomes minimal.

Figure 8:
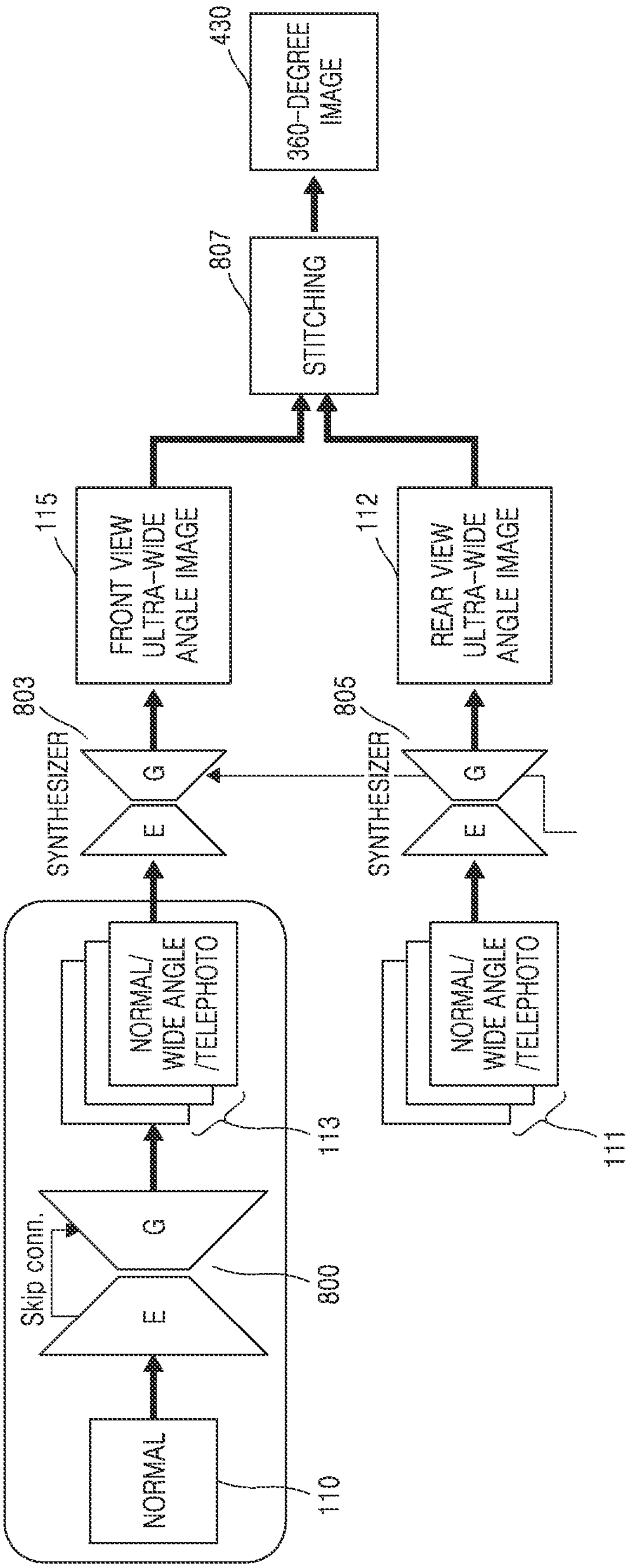
FIG. 8 is a diagram for describing an electronic apparatus obtaining a 360-degree image by using a neural network, according to an embodiment of the disclosure.

FIG. 8 is a diagram for describing the electronic apparatus 100 obtaining a 360-degree image by using a neural network 800, according to an embodiment of the disclosure.

The neural network 800 shown in FIG. 8 may be a completely-learned neural network. The completely-learned neural network 800 may be embedded in, for example, the electronic apparatus 100, an external server, and/or an external computing device, and may be used to obtain a plurality of images from an input image.

FIG. 8 is a diagram for describing that the neural network 800 is embedded in the electronic apparatus 100 and obtains a plurality of images from an input image.

The neural network 800 may be included in the processor 101 or the memory 103 of the electronic apparatus 100. Alternatively, the neural network 800 may be included in a position of the electronic apparatus 100 other than the processor 101 or the memory 103.

Referring to FIG. 8, the neural network 800 may receive an input of a first front view image 110 as input data. The first front view image 110 may be, for example, a frame, a scene, a group of pictures (GOP), and/or a video.

The first front view image 110 may be a photograph image of a front view which is obtained by photographing the front by the front camera 131 of the electronic apparatus 100. The first front view image 110 may vary according to a type of the front camera 131. For example, in FIG. 8, when the type of the front camera 131 is a normal camera, the first front view image 110 may be a normal image obtained by the front camera 131.

The neural network 800 may receive an input of the first front view image 110 as input data in real time as soon as the first front view image 110 is generated by the front camera 131.

Alternatively, the neural network 800 may receive an input of the first front view image 110 as input data which was pre-obtained via photographing by a user with the front camera 131 and was pre-stored in the memory 103. In this case, the neural network 800 may receive the input of the first front view image 110 as input data, based on that a control signal indicating to generate a 360-degree image is received from a user.

The neural network 800 may be an algorithm for extracting features from an input image and generating a new image based on the features, a set of algorithms, software for executing the set of algorithms, and/or hardware for executing the set of algorithms.

The neural network 800 may be the encoder-decoder model but is not limited thereto.

The neural network 800 may extract features from the input first front view image 110. The neural network 800 may extract the features by inputting the input first front view image 110 into a feature vector encoder.

The neural network 800 may be a learning model pre-learned features of rear view images obtained by a plurality of rear cameras. The neural network 800 may generate the plurality of second front view images 113 having features of rear view images, based on the features obtained from the first front view image 110 and the features of the rear view images.

The number of second front view images 113 may correspond to the number of rear cameras 141. For example, when the rear cameras 141 are three different cameras, i.e., a normal camera, a wide angle camera, and a telephoto camera, the second front view images 113 having the features of the rear view images may also be a normal image, a wide angle image, and a telephoto image.

Each of the second front view images 113 may have a different image feature. For example, when the rear cameras 141 are the normal camera, the wide angle camera, and the telephoto camera, the normal image, the wide angle image, and the telephoto image respectively obtained by the rear cameras may differ in, for example, a resolution, an optical magnification, an aperture, an angle of view, a pixel pitch, a dynamic range, and/or a depth, according to camera lens features.

For example, a size of an angle of view may increase in order of the telephoto image, the normal image, the wide angle image, and an ultra-wide angle image. Also, images obtained by different cameras may have different resolutions. In general, a resolution of an image obtained by the wide angle camera is greater than a resolution of an image obtained by an ultra-wide angle camera or the telephoto camera. Also, a high dynamic range (HDR) may differ in cameras. The HDR indicates a contrast ratio that is a difference between an available darkest level and an available brightest level, and as a range of the HDR increases, it is possible to express an image having a greater difference between a darkest level and a brightest level.

The neural network 800 may be a model that previously learned features of rear view images obtained by a plurality of rear cameras. The neural network 800 may be a model having learned a method of generating, from one front view image, a plurality of front view images having features of rear view images, by learning a camera lens feature of each of a plurality of rear cameras and a geometry relation between the plurality of rear cameras.

The neural network 800 may receive an input of the first front view image 110, and may generate, from the first front view image 110, the second front view images 113 having features of each of the plurality of rear view images.

For example, the neural network 800 may generate, from the first front view image 110, an image having a feature of a wide angle image as if the image were obtained by the wide angle camera from among the rear cameras 141. The neural network 800 may generate the image having the feature of the wide angle image from the first front view image 110, by considering a camera lens feature of the wide angle camera and the geometry relation between the plurality of rear cameras.

The neural network 800 may generate the image having the feature of the wide angle image from the first front view image 110 by generating an image of a boundary of the first front view image 110. The neural network 800 may generate the image of the boundary of the first front view image 110 by extrapolating data of the first front view image 110. Alternatively, the neural network 800 may pre-learn images having various geometry structures pre-stored in the memory 103 of the electronic apparatus 100 or training images having various geometry structures stored in an external database (DB) outside the electronic apparatus 100, and may generate the image of the boundary of the first front view image 110, based on the learned images. The neural network 800 may generate a boundary part not included in the first front view image 110, and thus, may generate, from the first front view image 110, an image as if the image were obtained by the wide angle camera.

The image generated from the first front view image 110 and having a feature of a wide angle image obtained by the wide angle camera may be an image in which a range of an angle of view is greater than a normal image and a distance to a target object looks further remote. Also, the image generated from the first front view image 110 and having the feature of the wide angle image may be an image in which a distance to a target object maintains a distance to the target object which is measured by the depth sensor provided in the rear surface or a depth sensor included in the wide angle camera from among the rear cameras.

Also, the image generated from the first front view image 110 and having the feature of the wide angle image may be an image in which a difference between different positions of the front camera 131 provided in the front surface 130 and the wide angle camera provided in the rear surface 140 is reflected, and may be the image having a view as if the image were captured at a position of the wide angle camera provided in the rear surface 140.

Equally, the neural network 800 may generate, from the first front view image 110, an image having a feature of a telephoto image as if the image were obtained by a telephoto camera from among the rear cameras 141. The neural network 800 may generate, from the first front view image 110, the image as if the image were obtained by the telephoto camera, by considering a camera lens feature of the telephoto camera and the geometry feature between the plurality of rear cameras.

The neural network 800 may zoom in and upscale the first front view image 110, and thus, may generate, from the first front view image 110, a high resolution image as if the high resolution image were obtained by the telephoto camera.

The image generated from the first front view image 110 and having the feature of the telephoto image generated by the telephoto camera may be an image in which a target object looks closer than that in a normal image and a size of the target object is enlarged. Also, the image generated from the first front view image 110 and having the feature of the telephoto image may be an image in which a distance to a target object maintains a distance to the target object which is measured by the depth sensor provided in the rear surface or a depth sensor included in the telephoto camera from among the rear cameras.

Also, the telephoto image generated from the first front view image 110 may be an image in which a difference between different positions of the front camera 131 provided in the front surface 130 and the telephoto camera provided in the rear surface 140 is reflected, and may be the image having a view as if the image were captured at a position of the telephoto camera provided in the rear surface 140.

Also, the neural network 800 may generate, from the first front view image 110, an image having a feature of a normal image. That is, the neural network 800 may generate the image having a camera lens feature and a geometry feature of a normal camera from among the rear cameras 141. The image generated by the neural network 800 and having the feature of the normal image may be an image different from the first front view image 110 that is a normal image used as input data. Even when the front camera 131 and a normal camera provided in the rear surface are all normal cameras, the two normal cameras may have different camera lens features such as different pixels, resolution, focal lengths, and/or depth values, and thus, images generated thereby may also have different image features.

An image generated from the first front view image 110 and having the feature of the normal image obtained by the normal camera at the rear surface may differ from the first front view image 110 in, for example, a range of an angle of view, and/or a resolution.

The image generated from the first front view image 110 and having the feature of the normal image obtained by the normal camera at the rear surface may be an image in which a distance to a target object maintains a distance to the target object which is measured by the depth sensor provided in the rear surface or a depth sensor included in the normal camera from among the rear cameras.

The image generated from the first front view image 110 and having the feature of the normal image obtained by the normal camera at the rear surface may be an image in which a difference between different positions of the front camera 131 provided in the front surface 130 and the normal camera provided in the rear surface 140 is reflected, and may be the image having a view as if the image were captured at a position of the normal camera provided in the rear surface 140.

The second front view images 113 generated from the first front view image 110 and having features of rear view images obtained by the rear cameras may be images in which the geometry relation between the plurality of rear cameras is maintained. That is, at least one of an angle-of-view relation between the second front view images 113, a relation of a target object size in the images, or a positional relation in the images may be equal to at least one of an angle-of-view relation, a size relation, or a positional relation between the rear view images obtained by the plurality of rear cameras.

The electronic apparatus 100 may include a first synthesizer 803 and a second synthesizer 805. The first synthesizer 803 and the second synthesizer 805 may be arranged in the processor 101 or the memory 103 or may be arranged and used at a position of the electronic apparatus 100 other than the processor 101 or the memory 103.

The first synthesizer 803 may generate the front view ultra-wide angle image 115 by synthesizing the second front view images 113 obtained by the neural network 800.

The first synthesizer 803 may detect feature points in the second front view images 113. The first synthesizer 803 may extract, as a feature point, a point having a minimum difference between pixels in the second front view images 113.

In order to further easily extract the feature points, the first synthesizer 803 may compensate one or more images from among the second front view images 113 by using a method of modifying a color and/or adjusting a size. The first synthesizer 803 may detect the feature points by comparing and analyzing all data of the second front view images 113, or may detect the feature points by analyzing data only within an error range from among random data arbitrarily extracted from the second front view images 113.

The first synthesizer 803 may match the feature points extracted from the second front view images 113. The first synthesizer 803 may concatenate the second front view images 113 by stitching the feature points corresponding to each other from among the extracted feature points, and thus, may generate one front view ultra-wide angle image 115.

The first synthesizer 803 may receive an input of a reference signal from a user. The reference signal may be a signal for selecting an area to be a reference in generation of an ultra-wide angle image. For example, in FIG. 8, an arrow marked with respect to the first synthesizer 803 and the second synthesizer 805 indicates the input of the reference signal from the user. The first synthesizer 803 may generate the front view ultra-wide angle image 115, based on an area selected according to the reference signal, in response to the reference signal being input.

The front view ultra-wide angle image 115 generated by the first synthesizer 803 may be an image obtained by synthesizing the second front view images 113, not a single image, and thus may be an ultra-high definition image having sufficient data.

The front view ultra-wide angle image 115 generated by the first synthesizer 803 may be an image having an angle of view of 180 degrees or more.

The second synthesizer 805 may obtain the rear view ultra-wide angle image 112 by synthesizing the plurality of rear view images 111. The electronic apparatus 100 may obtain the plurality of rear view images 111 by capturing the rear by using the plurality of rear cameras 141. The plurality of rear view images 111 may be images obtained at the same time when the first front view image 110 is obtained.

The second synthesizer 805 may receive an input of the plurality of rear view images 111 in real time as soon as the rear is photographed by the rear cameras 141 and thus the plurality of rear view images 111 are generated. Alternatively, based on that a control signal indicating to generate a 360-degree image is received from a user, the second synthesizer 805 may receive, as input data, an input of the plurality of rear view images 111 captured and generated by the rear cameras 141 at the same time as the first front view image 110 from among images pre-stored in the memory 103 in the electronic apparatus 100.

Equally to the first synthesizer 803, the second synthesizer 805 may detect feature points in the plurality of rear view images 111. The second synthesizer 805 may adjust a color or a size of the plurality of rear view images 111 so as to further easily extract the feature points. The second synthesizer 805 may match the detected feature points, may concatenate the plurality of rear view images 111, and thus, may generate the rear view ultra-wide angle image 112.

The second synthesizer 805 may receive an input of a reference signal from a user. For example, in FIG. 8, an arrow passing through the second synthesizer 805 indicates that the reference signal is input from the user. In response to the reference signal being input, the second synthesizer 805 may generate the rear view ultra-wide angle image 112, based on an area selected according to the reference signal.

The rear view ultra-wide angle image 112 generated by the second synthesizer 805 may be an image obtained by synthesizing the plurality of rear view images 111, not a single image, and thus may be an ultra-high definition image having sufficient data.

The rear view ultra-wide angle image 112 generated by the second synthesizer 805 may be an image having an angle of view of 180 degrees or more.

The first synthesizer 803 and/or the second synthesizer 805 may use a neural network model to generate an ultra-wide angle image, but the disclosed embodiments are not limited thereto.

The electronic apparatus 100 may generate a 360-degree image 430 by concatenating the front view ultra-wide angle image 115 and the rear view ultra-wide angle image 112 obtained by using the first synthesizer 803 and the second synthesizer 805. The front view ultra-wide angle image 115 and the rear view ultra-wide angle image 112 are each an image having an angle of view greater than 180 degrees, and thus, may have an area common to each other.

The electronic apparatus 100 may detect common areas overlapping in the front view ultra-wide angle image 115 and the rear view ultra-wide angle image 112, may match the common areas, and thus, may concatenate the front view ultra-wide angle image 115 and the rear view ultra-wide angle image 112.

The electronic apparatus 100 may include a stitching unit 807. The stitching unit 807 may synthesize two split images having an overlapping viewing angle by stitching the front view ultra-wide angle image 115 and the rear view ultra-wide angle image 112, and thus, may generate a panoramic image or the 360-degree image 430 which has a wide angle of view.

The 360-degree image 430 generated by concatenating the front view ultra-wide angle image 115 and the rear view ultra-wide angle image 112 may be an ultra-high definition image having sufficient data. Therefore, even when a user navigates the 360-degree image 430 and thus zooms in or out a part of the 360-degree image 430, information about an area selected by the user may be provided without degradation in an image quality. That is, as the electronic apparatus 100 has sufficient data about the 360-degree image 430, the electronic apparatus 100 may provide an image without degradation in quality to the user while continuously generating a zoom-in image or a zoom-out image by interpolating or extrapolating data of the corresponding area or neighboring data of the corresponding area.

Figure 9:
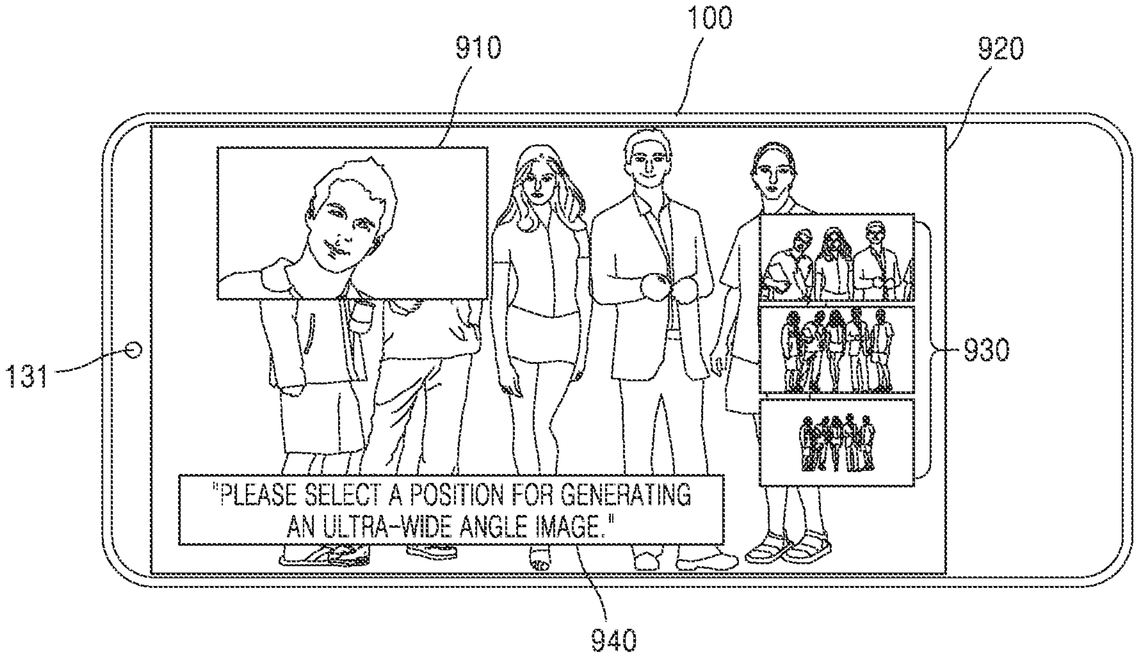
FIG. 9 is a diagram for describing an electronic apparatus receiving, from a user, an input of selecting a reference area for which an ultra-wide angle image is to be generated, according to an embodiment of the disclosure.

FIG. 9 is a diagram for describing the electronic apparatus 100 receiving, from a user, an input of selecting a reference area for which an ultra-wide angle image is to be generated, according to an embodiment of the disclosure.

Referring to FIG. 9, the electronic apparatus may photograph a target object by using a camera of the electronic apparatus 100. The electronic apparatus 100 may output, via a screen, a front view image 910 of the target object positioned at the front which is viewed via the front camera 131. The electronic apparatus may output a rear view image 920 together with the front view image 910, the rear view image 920 being about a target object positioned at the rear which is viewed via the rear camera 141.

For example, as illustrated in FIG. 9, the electronic apparatus 100 may simultaneously output, via one screen, the front view image 910 viewed via a camera lens of the front camera 131 and the rear view image 920 viewed via a camera lens of the rear camera 141. A size or an output position of the front view image 910 and the rear view image 920 may be variously changed.

The electronic apparatus 100 may output, to a center of a screen, the rear view image 920 captured by one representative camera from among the plurality of rear cameras 141.

The electronic apparatus 100 may output a plurality of rear view images 930 captured by respective lenses of the plurality of rear cameras 141 along with the rear view image 920 captured by the representative camera. The user may select one of the plurality of rear view images 930. The electronic apparatus 100 may allow a user-selected rear view image to be output to a center of the screen of the electronic apparatus 100.

When the electronic apparatus 100 receives, from the user, a control signal indicating to generate a panoramic image or a 360-degree image, the electronic apparatus 100 may output a guide user interface (UI) screen 940 corresponding to the control signal.

The guide UI screen 940 may include information for allowing the user to select an area that is a reference to generate an ultra-wide angle image. For example, as illustrated in FIG. 9, the guide UI screen 940 may include a sentence such as "Please select a position for generating an ultra-wide angle image". However, this is merely an example, and the electronic apparatus 100 may output a guide screen including, for example, various sentences, and/or signs. For example, a position, a color, and/or transparency of an output of the guide UI screen 940 may vary.

The user may input a reference signal, in response to the guide UI screen 940 being output via the screen of the electronic apparatus 100.

The reference signal may be a signal for selecting an area that is a reference to generate an ultra-wide angle image, and may include at least one of a first reference signal or a second reference signal. The first reference signal may be a signal for selecting a point of the front view image 910 which is a reference to generate the front view ultra-wide angle image 115, and the second reference signal may be a signal for selecting a point of the rear view image 920 which is a reference to generate the rear view ultra-wide angle image 112. A point that is a reference to generate an ultra-wide angle image may indicate an angle or a point which is a center in generation of the ultra-wide angle image.

For example, the user may select a point to be a center of the ultra-wide angle image, from among the front view image 910 and the rear view image 920 currently output to the screen. When the electronic apparatus 100 includes a touch pad capable of detecting a finger touch by the user, the user may input, by using, for example, a finger, and/or a touch pen, the reference signal by selecting one point of an image from among the front view image 910 and the rear view image 920 which are output to the screen of the electronic apparatus 100.

In response to an input of the reference signal, the electronic apparatus 100 may generate the ultra-wide angle image, based on the selected area according to the reference signal. For example, when the user selects one point, the electronic apparatus 100 may use a line vertically connecting the selected point as the reference signal, and then, may generate the ultra-wide angle image having the reference signal as a center line.

For example, when the user selects one point of the front view image 910, e.g., a first area, the electronic apparatus 100 may receive an input of the point as the first reference signal, and then may generate the front view ultra-wide angle image 115 having a vertical line passing the first area as a reference line. The electronic apparatus 100 may generate the front view ultra-wide angle image 115 having the vertical line passing the first area as a center line.

Equally, when the user selects one point of the rear view image 920, e.g., a second area, the electronic apparatus 100 may receive an input of the point as the second reference signal, and then may generate the rear view ultra-wide angle image 112 having a vertical line passing the second area as a reference line. The electronic apparatus 100 may generate the rear view ultra-wide angle image 112 having the vertical line passing the second area as a center line.

Figure 10:
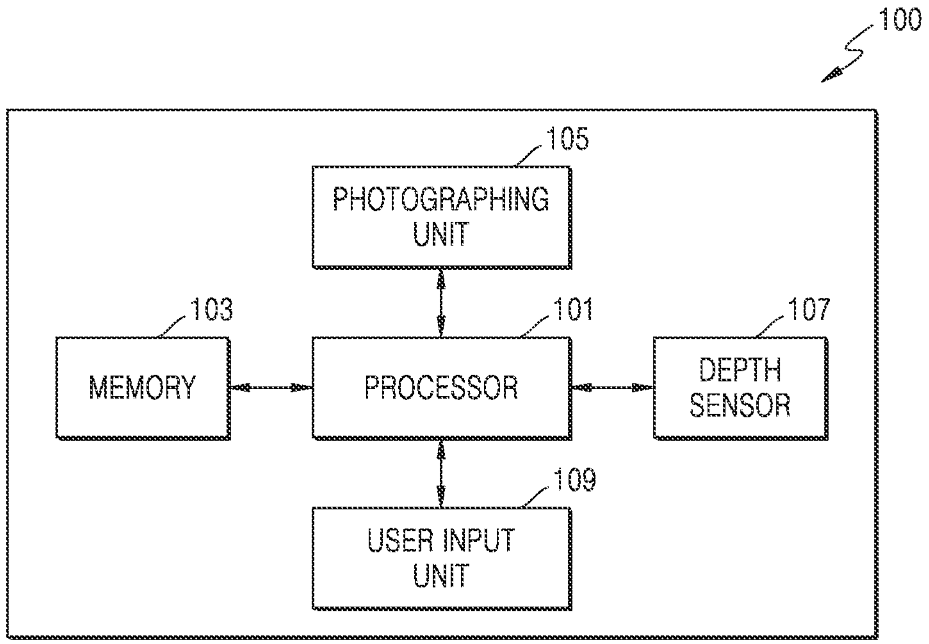
FIG. 10 illustrates an inner block diagram of an electronic apparatus according to an embodiment of the disclosure.

FIG. 10 illustrates an inner block diagram of the electronic apparatus 100 according to an embodiment of the disclosure.

The electronic apparatus 100 shown in FIG. 10 may be an example of the electronic apparatus 100 of FIG. 3. Therefore, functions of the processor 101 and the memory 103 included in the electronic apparatus 100 of FIG. 10 are the same as the processor 101 and the memory 103 included in the electronic apparatus 100 of FIG. 3, and thus, overlapping descriptions thereof are not provided here.

Referring to FIG. 10, the electronic apparatus 100 may further include a photographing unit 105, a depth sensor 107 and a user input unit 109 as well as the processor 101 and the memory 103.

The photographing unit 105 may include a camera. The photographing unit 105 may be integrated with the electronic apparatus 100. That is, the photographing unit 105 may be embedded at a fixed position of the electronic apparatus 100 and may photograph a target object.

The photographing unit 105 may generate an image by photographing a target object by using the camera, and may perform signal processing on the image. The photographing unit 105 may include an image sensor (not shown) such as a charge-coupled device (CCD), and/or a complementary metal-oxide-semiconductor (CMOS), and a lens (not shown), and may obtain an image formed on a screen by photographing a target object.

The photographing unit 105 may photograph a target object, thereby obtaining one frame or a video consisting of a plurality of frames. The photographing unit 105 may convert information about a target object formed as light on the image sensor into an electrical signal. Also, the photographing unit 105 may perform at least one signal processing from among auto exposure (AE), auto white balance (AWB), color recovery, correction, sharpening, gamma, and lens shading correction.

The photographing unit 105 may include a plurality of cameras. The photographing unit 105 may include at least one front camera 131 and the plurality of rear cameras 141. The front camera 131 may be a normal camera but is not limited thereto and may be a wide angle camera.

The plurality of rear cameras 141 may be at least two of a closeup camera, a normal camera, a wide angle camera, a telephoto camera, and a depth camera.

The depth sensor 107 may calculate a distance between a camera and a target object by using a time taken for light emitted toward the target object to return after being reflected from the target object, and may obtain information about a space where the target object is positioned. A scheme by which the depth sensor 107 recognizes a 3D depth may be one of a stereo type, a ToF scheme, and a structured pattern scheme.

FIG. 10 illustrates a case where the depth sensor 107 is included in the electronic apparatus 100 as a module or block separate from the photographing unit 105 but is not limited thereto and may be included in the photographing unit 105. For example, the depth sensor 107 may be included in a camera having a depth function from among cameras, and may obtain a distance to a target object when an image of the target object is obtained.

The user input unit 109 may receive a user input for controlling the electronic apparatus 100. The user input unit 109 may include various types of a user input device including a touch panel detecting the user's touch, a touch pad (e.g., a touch capacitive type touch pad, a pressure resistive type touch pad, an infrared beam sensing type touch pad, a surface acoustic wave type touch pad, an integral strain gauge type touch pad, and/or a piezo effect type touch pad), a button receiving a push operation of the user, a jog wheel receiving a rotation operation of the user, a jog switch, a keyboard, a key pad, a dome switch, a microphone identifying a voice, a motion detection sensor sensing a motion, but is not limited thereto. Also, when the electronic apparatus 100 is manipulated by a remote controller (not shown), the user input unit 109 may receive a control signal received from the remote controller.

The user input unit 109 may receive an input of a control signal from a user. The user may input, by using the user input unit 109, a control signal indicating to generate a panoramic image or a 360-degree image. Also, the user may input a reference signal for selecting an area that is a reference to generate an ultra-wide angle image, by selecting a point of an image output to the screen of the electronic apparatus 100.

Figure 11:
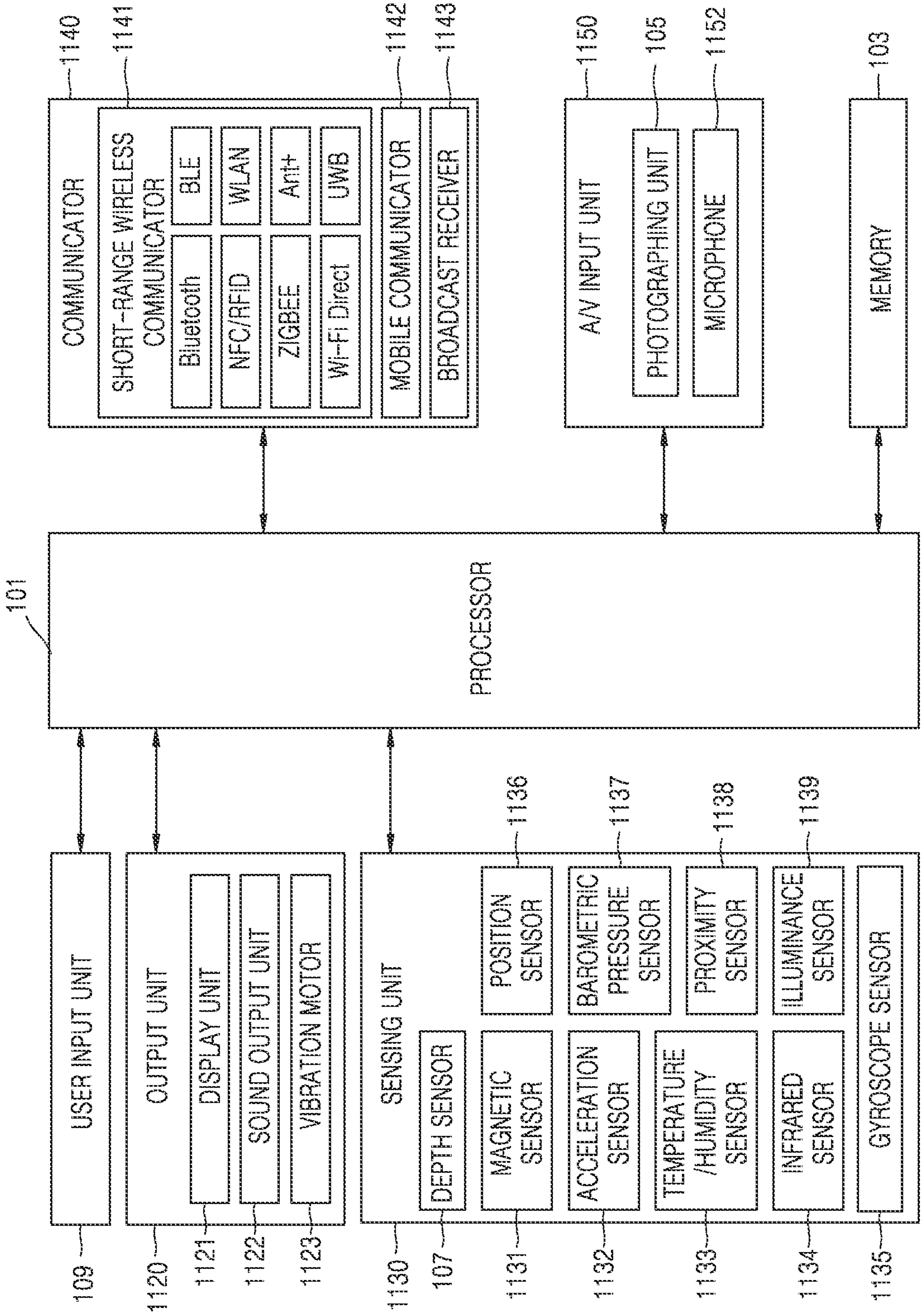
FIG. 11 illustrates an inner block diagram of an electronic apparatus according to an embodiment of the disclosure.

FIG. 11 illustrates an inner block diagram of the electronic apparatus 100 according to an embodiment of the disclosure.

The electronic apparatus 100 of FIG. 11 may include all elements of the electronic apparatus 100 of FIG. 10.

Referring to FIG. 11, the electronic apparatus 100 may further include an output unit 1120, a sensing unit 1130, a communicator 1140, and an audio/video (AN) input unit 1150 as well as the processor 101, the memory 103, the photographing unit 105, and the user input unit 109.

The output unit 1120 may output at least one of an audio signal, a video signal or a vibration signal. The output unit 1120 may include a display unit 1121, a sound output unit 1122, and a vibration motor 1123.

The display unit 1121 may output an image obtained and processed by the photographing unit 105.

The display unit 1121 may output an image of a target object, the image being captured by at least one of the front camera 131 or the rear camera 141.

The display unit 1121 may output a guide UI screen that is information for allowing a user to select an area that is a reference to generate an ultra-wide angle image.

Alternatively, the display unit 1121 may output, to the screen, for example, content which is received from, for example, a broadcasting station, an external server, and/or an external storage medium. The content may be, for example, a media signal including a video signal, an image, and/or a text signal.

The electronic apparatus 100 may process image data to be displayed by the display unit 1121, and may perform various image processing operations such as decoding, rendering, scaling, noise filtering, frame rate conversion, and/or resolution conversion on the image data. The display unit 1121 may output the image data processed by the electronic apparatus 100.

The sound output unit 1122 may output audio data received from the communicator 1140 or stored in the memory 103. Also, the sound output unit 1122 may output an audio signal associated with a function (e.g., call signal reception sound, message reception sound, notification sound) performed by the electronic apparatus 100. The sound output unit 1122 may include, for example, a speaker, a headphone connection terminal, and/or a buzzer.

The vibration motor 1123 may output a vibration signal. For example, the vibration motor 1123 may output a vibration signal corresponding to an output of audio data or video data (e.g., call signal reception sound, and/or message reception sound). Also, when a touch is input to a touch screen, the vibration motor 1123 may output a vibration signal.

The sensing unit 1130 may sense a state of the electronic apparatus 100 or a state of an environment of the electronic apparatus 100, and may transmit sensed information to the communicator 1140 or the processor 101.

The sensing unit 1130 may include the depth sensor 107. The depth sensor 107 may sense a distance to a target object.

The sensing unit 1130 may include, in addition to the depth sensor 107, at least one of a magnetic sensor 1131, an acceleration sensor 1132, a temperature/humidity sensor 1133, an infrared sensor 1134, a gyroscope sensor 1135, a position sensor 1136 (e.g., a global positioning system (GPS)), a barometric pressure sensor 1137, a proximity sensor 1138, or an illuminance sensor 1139, but is not limited thereto.

The communicator 1140 may include elements to perform communication with another device. The communicator may be referred to as a communication interface. For example, the communicator 1140 may include a short-range wireless communicator 1141, a mobile communicator 1142, and a broadcast receiver 1143.

The short-range wireless communicator 1141 may include a Bluetooth communicator, a Bluetooth low energy (BLE) communicator, a near-field communication (NFC) communicator, a wireless local area network (WLAN) (or Wi-Fi) communicator, a ZigBee communicator, an infrared data association (IrDA) communicator, a Wi-Fi direct (WFD) communicator, a ultra-wideband (UWB) communicator, or an Ant+ communicator, but is not limited thereto.

The BLE communicator may transmit a BLE signal constantly, periodically, at random intervals or at preset intervals.

The mobile communicator 1142 transmits and receives wireless signals to and from at least one of a base station, an external device, or a server in a mobile communication network. Herein, the wireless signals may include various types of data based on transmission and reception of voice call signals, video call signals, or text/multimedia messages.

The broadcast receiver 1143 receives broadcast signals and/or broadcast information through broadcast channels from outside. The broadcast channels may include satellite channels and terrestrial channels. The electronic apparatus 100 may not include the broadcast receiver 1143.

The A/V input unit 1150 is used to input audio signals or video signals, and may include, for example, the photographing unit 105, and/or a microphone 1152.

The photographing unit 105 may include a camera. The camera may obtain image frames such as still images or moving images by using an image sensor in a video call mode or a photographing mode. An image captured by the image sensor may be processed by the processor 101 or a separate image processor (not shown).

An image frame processed by the camera may be stored in the memory 103 or may be transmitted to the outer source via the communicator 1140. According to a configuration specification of a terminal, the camera may include at least one camera at a front surface of the terminal and a plurality of cameras at a rear surface thereof.

The microphone 1152 may receive an external audio signal and may process the same into electrical voice data. For example, the microphone 1152 may receive the audio signal from an external device or a user. The microphone 1152 may use various denoising algorithms to remove noise occurring in a process of receiving an input of an external audio signal.

Figure 12:
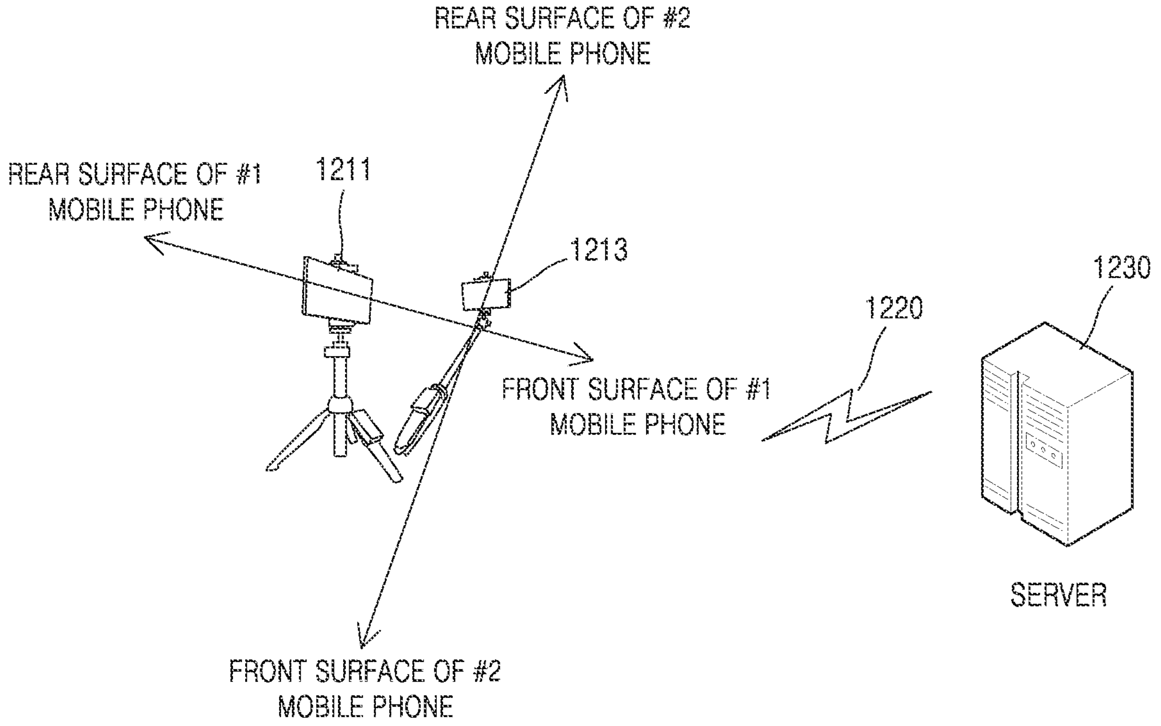
FIG. 12 is a diagram for describing generation of a 360-degree image based on images obtained by using a plurality of electronic apparatuses, according to an embodiment of the disclosure.

FIG. 12 is a diagram for describing generation of a 360-degree image based on images obtained by using a plurality of electronic apparatuses, according to an embodiment of the disclosure.

The plurality of electronic apparatuses are apparatuses, e.g., mobile phones, which include a camera.

Each of the plurality of electronic apparatuses may have at least one camera at its front surface and rear surface. The plurality of electronic apparatuses may obtain a front view image and a rear view image by photographing the front and the rear of an electronic apparatus by using the camera provided in each of a front surface and a rear surface of the electronic apparatus.

The plurality of electronic apparatuses may further include a depth sensor at each of the front surface and the rear surface of the electronic apparatus. The depth sensor may be included in the camera or may be included as a sensor separate from the camera in the electronic apparatus.

The plurality of electronic apparatuses may be arrayed to face different directions. The plurality of electronic apparatuses may be arrayed to face directions or views that are not equal to each other.

For example, the plurality of electronic apparatuses may be arrayed to face the front and the rear at intervals with an accurately preset angle, but the disclosed embodiments are not limited thereto.

The number of electronic apparatuses obtaining a front view image and a rear view image may be N, and N electronic apparatuses may each obtain a front view image and a rear view image.

Referring to FIG. 12, each of the plurality of electronic apparatuses may be #1 mobile phone 1211 or #2 mobile phone 1213. Each of #1 mobile phone 1211 and #2 mobile phone 1213 may obtain a front view image and a plurality of rear view images at the same time.

The front of #1 mobile phone 1211 and the front of #2 mobile phone 1213 may be arrayed to face directions separate by 90 degrees. For example, the front of #1 mobile phone 1211 faces the east, the rear of #1 mobile phone 1211 faces the west, the front of #2 mobile phone 1213 faces the south, and the rear of #2 mobile phone 1213 faces the north.

#1 mobile phone 1211 may obtain a front view image of a target object positioned in an east direction by using a front camera, and may obtain a rear view image of the target object positioned in a west direction by using a rear camera. When a plurality of rear cameras are provided in #1 mobile phone 1211, #1 mobile phone 1211 may obtain a plurality of rear view images of the target object positioned in the west direction by using the plurality of rear cameras.

Equally, #2 mobile phone 1213 may obtain a front view image of a target object positioned in a south direction by using a front camera, and may obtain a rear view image of the target object positioned in a north direction by using a rear camera. When a plurality of rear cameras are provided in #2 mobile phone 1213, #2 mobile phone 1213 may obtain a plurality of rear view images of the target object positioned in the north direction by using the plurality of rear cameras.

However, this is merely an embodiment, and thus, it is not necessary that the front of #1 mobile phone 1211 and the front of #2 mobile phone 1213 have a 90-degree interval with respect to each other, and it may be sufficient that the front and the rear of #1 mobile phone 1211 and the front and the rear of #2 mobile phone 121 respectively face different directions.

#1 mobile phone 1211 and #2 mobile phone 1213 may simultaneously transmit the obtained front image and the obtained plurality of rear view images to a server 1230 via a communication network 1220. Also, #1 mobile phone 1211 and #2 mobile phone 1213 may transmit depth information about the target object in the front and depth information about the target object in the rear which are obtained at the same time to the server 1230 via the communication network 1220.

The server 1230 may receive front and rear view images and front and rear depth information from each of #1 mobile phone 1211 and #2 mobile phone 1213 via the communication network 1220.

The server 1230 may include a neural network. The neural network included in the server 1230 may be a neural network trained to generate, from a front view training image and a plurality of rear view training images, a plurality of front view training images having features of a plurality of rear view images obtained by a plurality of rear cameras.

The neural network included in the server 1230 may be a neural network learned image features by using training data for each of the plurality of electronic apparatuses, e.g., for each of models of the plurality of electronic apparatuses. That is, the neural network included in the server 1230 may be a neural network pre-learned features of each camera of each model of the plurality of electronic apparatuses and image features obtained by each camera.

The neural network included in the server 1230 may be a learning model trained to generate a plurality of front view training images having features of a plurality of rear view images obtained by a plurality of rear cameras, from a front view training image and a plurality of rear view training images satisfying a model specification of #1 mobile phone 1211. Also, the neural network included in the server 1230 may be a learning model trained to generate a plurality of front view training images having features of a plurality of rear view images obtained by a plurality of rear cameras, from a front view training image and a plurality of rear view training images satisfying a model specification of #2 mobile phone 1213.

In response to a front view image and a plurality of rear view images being received from #1 mobile phone 1211, the server 1230 may obtain, from the front view image received from #1 mobile phone 1211, by using the neural network, a plurality of front view images having features of a plurality of rear view images obtained by the plurality of rear cameras provided in a rear surface of #1 mobile phone 1211.

When #1 mobile phone 1211 includes a wide angle camera and a telephoto camera as the rear cameras, the server 1230 may obtain, from the front view image, an image having a feature of a wide angle image obtained by the wide angle camera from among the rear cameras, and an image having a feature of a telephoto image obtained by the telephoto camera.

The image obtained from the front view image and having the feature of the wide angle image may be an image in which a range of an angle of view is greater than the front view image and a distance to a target object looks further remote. Also, the image having the feature of the wide angle image may be an image in which a distance to a target object maintains a distance to the target object which is measured by the depth sensor provided in the rear surface or a depth sensor included in the wide angle camera from among the rear cameras. Also, the image generated from the front view image and having the feature of the wide angle image may be an image for which a difference between different positions of the front camera provided in the front surface and the wide angle camera provided in the rear surface is considered, and may be the image having a view as if the image were captured at a position of the wide angle camera provided in the rear surface.

The image generated from the front view image and having the feature of the telephoto image may be an image in which a range of an angle of view is smaller than the front view image and a distance to a target object looks closer. Also, the image having the feature of the telephoto image may be an image in which a distance to a target object maintains a distance to the target object which is measured by the depth sensor provided in the rear surface or a depth sensor included in the telephoto camera from among the rear cameras. Also, the image generated from the front view image and having the feature of the telephoto image may be an image for which a difference between different positions of the front camera provided in the front surface and the telephoto camera provided in the rear surface is considered, and may be the image having a view as if the image were captured at a position of the telephoto camera provided in the rear surface.

A plurality of images generated from the front view image and having features of rear view images obtained by the plurality of rear cameras may be images in which a geometry relation between the plurality of rear cameras is maintained. That is, at least one of an angle-of-view relation between the plurality of images, a relation of a target object size in the images, or a positional relation in the images may be equal to at least one of an angle-of-view relation, a size relation, or a positional relation between images obtained by the plurality of rear cameras.

The server 1230 may obtain, from the front view image of #1 mobile phone 1211, a first front view ultra-wide angle image by synthesizing a plurality of front view images having the features of the rear view images obtained by the plurality of rear cameras.

The server 1230 may obtain a first rear view ultra-wide angle image by synthesizing a plurality of rear view images received from #1 mobile phone 1211.

Equally, the server 1230 may obtain, by using the neural network, from the front view image received from #2 mobile phone 1213, a plurality of front view images having features of a plurality of rear view images obtained by a plurality of rear cameras provided in a rear surface of #2 mobile phone 1213.

The server 1230 may obtain, from the front view image of #2 mobile phone 1213, a second front view ultra-wide angle image by synthesizing a plurality of front view images having the features of the rear view images obtained by the plurality of rear cameras.

The server 1230 may obtain a second rear view ultra-wide angle image by synthesizing a plurality of rear view images received from #2 mobile phone 1213.

The server 1230 may synthesize all of the first front view ultra-wide angle image, the second front view ultra-wide angle image, the first rear view ultra-wide angle image, and the second rear view ultra-wide angle image.

The server 1230 may detect feature points of common areas from the first front view ultra-wide angle image, the second front view ultra-wide angle image, the first rear view ultra-wide angle image, and the second rear view ultra-wide angle image, may concatenate the images by matching the detected feature points, and thus, may obtain a panoramic image or a 360-degree image.

The server 1230 may generate a 360-degree image, based on an image obtained by using one camera, or may generate a panoramic image or a 360-degree image, based on a plurality of images obtained by using a plurality of cameras. The more the number of cameras increases, the more the number of images obtained using the cameras increases, such that a panoramic image or a 360-degree image having a high-definition image quality may be generated.

Figure 13:
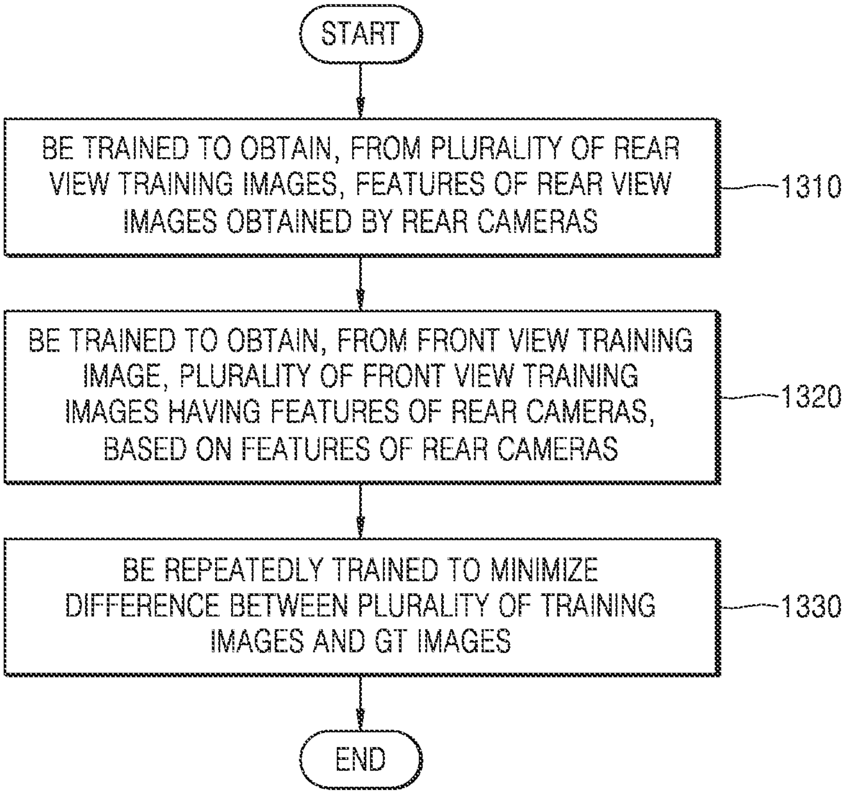
FIG. 13 illustrates a flowchart of a neural network being trained, according to an embodiment of the disclosure.

FIG. 13 illustrates a flowchart of a neural network being trained, according to an embodiment of the disclosure.

Referring to FIG. 13, the neural network may receive, as training data, an input of a front view image obtained by a front camera and front distance information obtained by a front depth sensor, and rear view images obtained by a plurality of rear cameras and rear distance information obtained by a rear depth sensor.

The neural network may be trained to obtain, from a plurality of rear view training images, features of rear view images obtained by the rear cameras (operation 1310).

In more detail, the neural network may be trained to obtain the features of the rear view images by performing computation to analyze and classify the plurality of rear view training images.

A feature of a rear view training image may be a feature of a rear view image obtained by a rear camera.

The feature of the rear view image obtained by the rear camera may include at least one of a camera lens feature or a geometry feature.

The camera lens feature may include at least one of a resolution, an optical magnification, an aperture, an angle of view, a pixel pitch, a dynamic range, or a depth.

The neural network may be trained to obtain a camera lens feature from each of the plurality of rear view training images.

The geometry feature may include at least one feature from among an angle of view relation, a size relation, and a position relation between the plurality of rear view images obtained by the plurality of rear cameras. The neural network may be trained to obtain the geometry feature from a relation between the plurality of rear view training images.

The neural network may be trained by using a plurality of training images so as to set values of weights each indicating a connection strength between nodes forming the neural network.

The neural network may be trained to obtain, from a front view training image, a plurality of front view training images having the features of the rear view images, based on the features of the rear view images obtained by the rear cameras (operation 1320).

The neural network may be an encoder-decoder model but is not limited thereto.

The plurality of training images generated by the neural network may be compared with ground truth (GT) images by a discriminator. The GT images may be images obtained by photographing the front by using the plurality of cameras.

The neural network may be repeatedly trained to minimize a difference between the plurality of training images and the GT images (operation 1330).

The values of the weights of the neural network may be optimized via repetitive learning, and may be repeatedly modified until an accuracy of a result thereof satisfies a preset degree of reliability.

Figure 14:
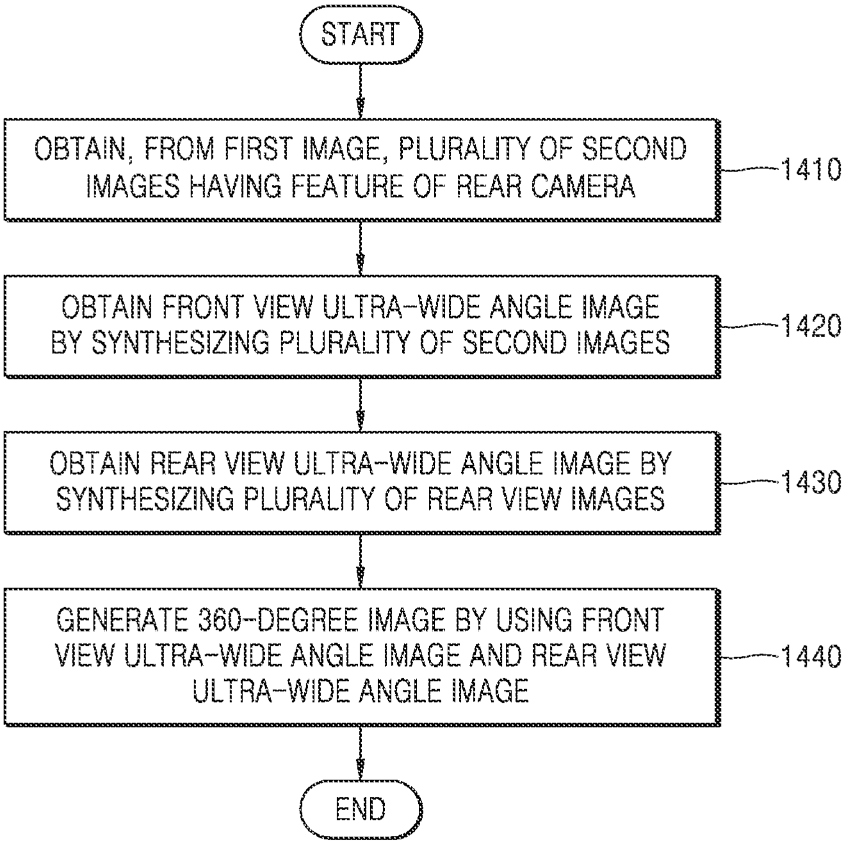
FIG. 14 illustrates a flowchart of a method of generating a 360-degree image, according to an embodiment of the disclosure.

FIG. 14 illustrates a flowchart of a method of generating a 360-degree image, according to an embodiment of the disclosure.

The electronic apparatus 100 may obtain a first front view image 110.

The electronic apparatus 100 may obtain the first front view image 110 by photographing the front by using the front camera 131 provided in the electronic apparatus 100.

The electronic apparatus 100 may obtain, from the first front view image 110, a plurality of second front view images 113 having a feature of a rear view image obtained by a rear camera (operation 1410).

The feature of the rear view image obtained by the rear camera may be features of rear view images obtained by a plurality of rear cameras provided in the rear surface of the electronic apparatus 100.

The electronic apparatus 100 may obtain, by using the neural network, the plurality of second front view images 113 from the first front view image 110.

The neural network may be a learning model trained to generate, from one front view training image and a plurality of rear view training images, a plurality of front view training images having features of rear view images obtained by the plurality of rear cameras.

The neural network may be a learning model trained to minimize a loss between a plurality of ground truth images obtained by photographing the front by using a plurality of rear cameras and a plurality of front view training images.

The electronic apparatus 100 may obtain the front view ultra-wide angle image 115 by synthesizing the plurality of second front view images 113 (operation 1420).

The electronic apparatus 100 may detect feature points between the plurality of second front view images 113, and may synthesize the plurality of second front view images 113 by matching the detected feature points.

The electronic apparatus 100 may obtain the plurality of rear view images 111 by photographing the rear by using the plurality of rear cameras 141 provided in the electronic apparatus 100.

The electronic apparatus 100 may obtain the rear view ultra-wide angle image 112 by synthesizing the plurality of rear view images 111 (operation 1430).

The electronic apparatus 100 may generate a 360-degree image by using the front view ultra-wide angle image 115 and the rear view ultra-wide angle image 112 (operation 1440).

The electronic apparatus 100 may detect feature points between the front view ultra-wide angle image 115 and the rear view ultra-wide angle image 112, and may concatenate the front view ultra-wide angle image 115 and the rear view ultra-wide angle image 112 by using the detected feature points.

An operating method and apparatus may be embodied as a computer-readable recording medium, e.g., a program module to be executed in computers, which includes computer-readable instructions. The computer-readable recording medium may include any usable medium that may be accessed by computers, volatile and non-volatile medium, and detachable and non-detachable medium. Also, the computer-readable recording medium may include both a computer storage medium and a communication medium. The computer storage medium includes all volatile and non-volatile media, and detachable and non-detachable media which are technically implemented to store information including computer-readable instructions, data structures, program modules or other data. The communication medium includes computer-readable instructions, a data structure, a program module, other data as modulation-type data signals such as carrier signals, or other transmission mechanism, and includes other information transmission media.

Also, an electronic apparatus and an operating method of the electronic apparatus described above may be implemented as a computer program product including a computer-readable recording medium/storage medium having recorded thereon a program for implementing the operating method of the electronic apparatus, the operating method including obtaining a plurality of second front view images, from a first front view image obtained by a front camera, obtaining a front view ultra-wide angle image by synthesizing the plurality of second front view images, obtaining a rear view ultra-wide angle image by synthesizing a plurality of rear view images, and generating a 360-degree image by synthesizing the front view ultra-wide angle image and the rear view ultra-wide angle image.

A machine-readable storage medium may be provided in the form of a non-transitory storage medium. The term 'non-transitory storage medium' may mean that the storage medium is a tangible device and does not include signals (e.g., electromagnetic waves), and may mean that data may be permanently or temporarily stored in the storage medium. For example, the 'non-transitory storage medium' may include a buffer in which data is temporarily stored.

The method may be included and provided in a computer program product. The computer program product may be traded as a product between a seller and a buyer. The computer program product may be distributed in the form of a machine-readable storage medium (e.g., a compact disc read only memory (CD-ROM)) or may be distributed (e.g., downloaded or uploaded) online through an application store or directly between two user apparatuses. In a case of online distribution, at least a portion of the computer program product (e.g., a downloadable application) may be at least temporarily stored or temporarily generated in a machine-readable storage medium such as a manufacturer's server, a server of an application store, or a memory of a relay server.

The invention claimed is:

1. An electronic apparatus comprising:

a memory storing at least one instruction; and at least one processor configured to execute the at least one instruction to:

obtain a plurality of second front view images from a first front view image that is obtained by a front camera, obtain a front view ultra-wide angle image by synthesizing the plurality of second front view images, obtain a rear view ultra-wide angle image by synthesizing a plurality of rear view images, and generate a 360-degree image by synthesizing the front view ultra-wide angle image and the rear view ultra-wide angle image, wherein the at least one processor is configured to execute the at least one instruction to obtain the plurality of second front view images from the first front view image by using a neural network, and wherein the plurality of second front view images are images having features of rear view images obtained by a plurality of rear cameras.

2. The electronic apparatus of claim 1, wherein the neural network is a learning model trained to generate, from one front view training image and a plurality of rear view training images, a plurality of front view training images having features of the plurality of rear view training images, the plurality of rear view training images being obtained by a plurality of rear cameras.

3. The electronic apparatus of claim 2, wherein the neural network is the learning model trained to minimize a loss between a plurality of ground truth images and the plurality of front view training images, the plurality of ground truth images being obtained by photographing a front face by using the plurality of rear cameras.

4. The electronic apparatus of claim 1, wherein the features of the rear view images obtained by the plurality of rear cameras include at least one of a camera lens feature or a geometry feature.

5. The electronic apparatus of claim 4, wherein the camera lens feature includes at least one of a resolution, an optical magnification, an aperture, an angle of view, a pixel pitch, a dynamic range, or a depth.

6. The electronic apparatus of claim 4, wherein the geometry feature includes at least one feature from among an angle of view relation, a size relation, and a position relation between the plurality of rear view images obtained by the plurality of rear cameras.

7. The electronic apparatus of claim 1, wherein the plurality of rear view images include at least two of a normal image, a wide angle image, or a telephoto image.

8. The electronic apparatus of claim 1, further comprising a user input interface, wherein the at least one processor is further configured to execute the at least one instruction to:

receive an input of at least one of a first reference signal or a second reference signal via the user input interface, generate, based on the first reference signal being received, the front view ultra-wide angle image based on a first area selected according to the first reference signal, and generate, based on the second reference signal being received, the rear view ultra-wide angle image based on a second area selected according to the second reference signal.

9. The electronic apparatus of claim 1, further comprising a photographing unit comprising the front camera and a plurality of rear cameras, the plurality of rear cameras being configured to obtain the plurality of rear view images.

10. The electronic apparatus of claim 1, further comprising a communication interface, wherein the at least one processor is further configured to execute the at least one instruction to, via the communication interface, receive the first front view image and the plurality of rear view images from a first user terminal and transmit the 360-degree image to the first user terminal.

11. An operating method of an electronic apparatus, the operating method comprising:

obtaining a plurality of second front view images from a first front view image that is obtained by a front camera;

obtaining a front view ultra-wide angle image by synthesizing the plurality of second front view images;

obtaining a rear view ultra-wide angle image by synthesizing a plurality of rear view images; and generating a 360-degree image by synthesizing the front view ultra-wide angle image and the rear view ultra-wide angle image, wherein the obtaining the plurality of second front view images comprises obtaining the plurality of second front view images from the first front view image by using a neural network, and wherein the plurality of second front view images are images having features of rear view images obtained by a plurality of rear cameras.

12. The operating method of claim 11, wherein the neural network is a learning model trained to generate, from one front view training image and a plurality of rear view training images, a plurality of front view training images having features of the plurality of rear view training images, the plurality of rear view training images being obtained by a plurality of rear cameras.

13. The operating method of claim 12, wherein the neural network is the learning model trained to minimize a loss between a plurality of ground truth images and the plurality of front view training images, the plurality of ground truth images being obtained by photographing a front face by using the plurality of rear cameras.

14. The operating method of claim 11, wherein the features of the rear view images obtained by the plurality of rear cameras include at least one of a camera lens feature or a geometry feature.

15. The operating method of claim 14, wherein the camera lens feature includes at least one of a resolution, an optical magnification, an aperture, an angle of view, a pixel pitch, a dynamic range, or a depth.

16. The operating method of claim 14, wherein the geometry feature includes at least one feature from among an angle of view relation, a size relation, and a position relation between the plurality of rear view images obtained by the plurality of rear cameras.

17. The operating method of claim 11, wherein the plurality of rear view images include at least two of a normal image, a wide angle image, or a telephoto image.

18. The operating method of claim 11, further comprising receiving at least one of a first reference signal or a second reference signal, wherein the obtaining the front view ultra-wide angle image comprises generating, based on the first reference signal being received, the front view ultra-wide angle image based on a first area selected according to the first reference signal, and wherein the obtaining the rear view ultra-wide angle image comprises generating, based on the second reference signal being received, the rear view ultra-wide angle image based on a second area selected according to the second reference signal.

19. The operating method of claim 11, wherein the electronic apparatus comprises the front camera, and the plurality of rear cameras, and wherein the operating method further comprises:

obtaining the first front view image by the front camera; and obtaining the plurality of rear view images by the plurality of rear cameras.

20. A non-transitory computer-readable recording medium having recorded thereon a program executable by a computer to perform an operating method including:

obtaining a plurality of second front view images from a first front view image that is obtained by a front camera;

obtaining a front view ultra-wide angle image by synthesizing the plurality of second front view images;

obtaining a rear view ultra-wide angle image by synthesizing a plurality of rear view images; and generating a 360-degree image by synthesizing the front view ultra-wide angle image and the rear view ultra-wide angle image, wherein the obtaining the plurality of second front view images comprises obtaining the plurality of second front view images from the first front view image by using a neural network, and wherein the plurality of second front view images are images having features of rear view images obtained by a plurality of rear cameras.

* * * * *